United States Patent
Cheong et al.

(10) Patent No.: US 12,432,801 B2
(45) Date of Patent: Sep. 30, 2025

(54) ELECTRONIC DEVICE, METHOD, AND COMPUTER READABLE STORAGE MEDIUM FOR CHANGING RECEPTION TIMING FROM EXTERNAL ELECTRONIC DEVICE WITHIN WIRELESS ENVIRONMENT

(71) Applicant: SAMSUNG ELECTRONICS CO., LTD., Suwon-si (KR)

(72) Inventors: Gupil Cheong, Suwon-si (KR); Seongbok Kim, Suwon-si (KR); Hyungseoung Yoo, Suwon-si (KR); Juyeon Jin, Suwon-si (KR); Doosuk Kang, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 616 days.

(21) Appl. No.: 17/902,408

(22) Filed: Sep. 2, 2022

(65) Prior Publication Data
US 2023/0164860 A1 May 25, 2023

Related U.S. Application Data

(63) Continuation of application No. PCT/KR2022/011479, filed on Aug. 3, 2022.

(30) Foreign Application Priority Data

Nov. 25, 2021 (KR) ........................ 10-2021-0164139

(51) Int. Cl.
*H04W 76/15* (2018.01)
*H04W 4/80* (2018.01)

(52) U.S. Cl.
CPC .............. *H04W 76/15* (2018.02); *H04W 4/80* (2018.02)

(58) Field of Classification Search
CPC ....... H04W 76/15; H04W 4/80; H04W 72/56; H04W 72/0446; H04W 72/40; H04W 84/18
See application file for complete search history.

(56) References Cited

U.S. PATENT DOCUMENTS 6,950,859 B1 * 9/2005 Bartek .................. H04W 84/20
709/227
9,641,963 B2 5/2017 Park et al.
(Continued)

FOREIGN PATENT DOCUMENTS

KR 20110014999 A 2/2011
KR 20170062853 A 6/2017
(Continued)

OTHER PUBLICATIONS

International Search Report and Written Opinion for International Application No. PCT/KR2022/011479; International Filing Date Aug. 3, 2022; Date of Mailing Nov. 11, 2022; 8 Pages.

*Primary Examiner* — Justin T Van Roie
(74) *Attorney, Agent, or Firm* — CANTOR COLBURN LLP

(57) ABSTRACT

An electronic device having a communication circuitry, at least one memory, and at least one processor is provided. The processor is configured to identify a first communication link with a first external electronic device operating as a first master device with respect to the electronic device and a second communication link with a second external electronic device operating as a second master device with respect to the electronic device, identify whether at least a portion of first time resources used for the first communication link overlap with at least portion of second time resources used or to be used for the second communication link and transmit one of a first request signal for adjusting the first time resources and a second request signal for (Continued)

adjusting the second time resources based on identifying that at least the portion of the first time resources overlap with at least the portion of the second time resources.

20 Claims, 15 Drawing Sheets

(56) References Cited

U.S. PATENT DOCUMENTS

| | | | | |
|---|---|---|---|---|
| 10,652,659 | B2* | 5/2020 | Bhalla | H04R 3/12 |
| 2017/0111846 | A1* | 4/2017 | Kang | H04W 40/22 |
| 2017/0295573 | A1 | 10/2017 | Klemmensen et al. | |
| 2018/0152917 | A1* | 5/2018 | Knaappila | H04W 4/80 |
| 2018/0270884 | A1* | 9/2018 | Fraser | H04L 41/0803 |
| 2018/0288623 | A1* | 10/2018 | Hampel | H04W 16/14 |
| 2019/0075611 | A1* | 3/2019 | Rabii | H04W 76/15 |
| 2019/0159271 | A1* | 5/2019 | Wang | H04W 76/14 |
| 2019/0246221 | A1* | 8/2019 | Shariati | H04N 21/00 |
| 2019/0327675 | A1* | 10/2019 | Takeuchi | H04W 76/14 |
| 2020/0260322 | A1 | 8/2020 | Chen | |
| 2020/0323275 | A1* | 10/2020 | Baker | H04W 4/80 |
| 2020/0374820 | A1* | 11/2020 | Srivastava | H04L 5/0055 |
| 2020/0396681 | A1* | 12/2020 | Murali | H04L 9/0825 |
| 2021/0306749 | A1 | 9/2021 | Young et al. | |
| 2022/0346167 | A1 | 10/2022 | Cheong et al. | |
| 2024/0215088 | A1* | 6/2024 | Wang | H04W 12/50 |

FOREIGN PATENT DOCUMENTS

| | | |
|---|---|---|
| KR | 20210020542 A | 2/2021 |
| KR | 20220043681 A | 4/2022 |
| WO | 2014204272 A1 | 12/2014 |
| WO | 2021161096 A1 | 8/2021 |

* cited by examiner

ELECTRONIC DEVICE, METHOD, AND COMPUTER READABLE STORAGE MEDIUM FOR CHANGING RECEPTION TIMING FROM EXTERNAL ELECTRONIC DEVICE WITHIN WIRELESS ENVIRONMENT

CROSS-REFERENCE TO RELATED APPLICATION(S)

This application is a continuation of PCT International Application No. PCT/KR2022/011479, which was filed on Aug. 3, 2022, and claims priority to Korean Patent Application No. 10-2021-0164139, filed on Nov. 25, 2021, in the Korean Intellectual Property Office, the disclosure of which are incorporated by reference herein their entirety.

BACKGROUND

Technical Field

The following descriptions relate to an electronic device, a method, and a non-transitory computer readable storage media for managing a reception timing from an external electronic device within a wireless environment.

Description Of Related Art

Bluetooth low energy (BLE) may provide reduced power consumption and provide at least similar or often greater communication range between connected devices compared to legacy Bluetooth (or classical Bluetooth). The BLE may be provided on an industrial, scientific, and medical (ISM) radio band.

SUMMARY

According to an embodiment, an electronic device may comprise a communication circuitry for Bluetooth low energy (BLE), at least one memory configured to store instructions, and at least one processor operably coupled with the communication circuitry; wherein the at least one processor may be, when the instructions are executed, configured to, while a first communication link with a first external electronic device operating as a first master device with respect to the electronic device is maintained, identify a second communication link with a second external electronic device operating as a second master device with respect to the electronic device; identify whether at least a portion of first time resources used for the first communication link overlap with at least portion of second time resources used or to be used for the second communication link or not; and based on identifying that at least the portion of the first time resources overlap with at least the portion of the second time resources, transmit a first request signal for adjusting the first time resources to the first external electronic device or transmit a second request signal for adjusting the second time resources to the second external electronic device.

According to an embodiment, a method for operating an electronic device with a communication circuitry for Bluetooth low energy (BLE), the method may comprise while a first communication link with a first external electronic device operating as a first master device with respect to the electronic device is maintained, establishing a second communication link with a second external electronic device operating as a second master device with respect to the electronic device; identifying whether at least a portion of first time resources used for the first communication link overlap with at least portion of second time resources used or to be used for the second communication link or not; and based on identifying that at least the portion of the first time resources overlap with at least the portion of the second time resources, transmitting a first request signal for adjusting the first time resources to the first external electronic device or transmitting a second request signal for adjusting the second time resources to the second external electronic device.

According to an embodiment, a non-transitory computer readable storage medium may store one or more programs, the one or more programs comprising instructions which, when executed by at least one processor of an electronic device with a communication circuitry for Bluetooth low energy (BLE), cause the electronic device to, while a first communication link with a first external electronic device operating as a first master device with respect to the electronic device is maintained, identify a second communication link with a second external electronic device operating as a second master device with respect to the electronic device; identify whether at least a portion of first time resources used for the first communication link overlap with at least portion of second time resources used or to be used for the second communication link or not; and based on identifying that at least the portion of the first time resources overlap with at least the portion of the second time resources, transmit a first request signal for adjusting the first time resources to the first external electronic device or transmit a second request signal for adjusting the second time resources to the second external electronic device.

DETAILED DESCRIPTION

Figure 1:
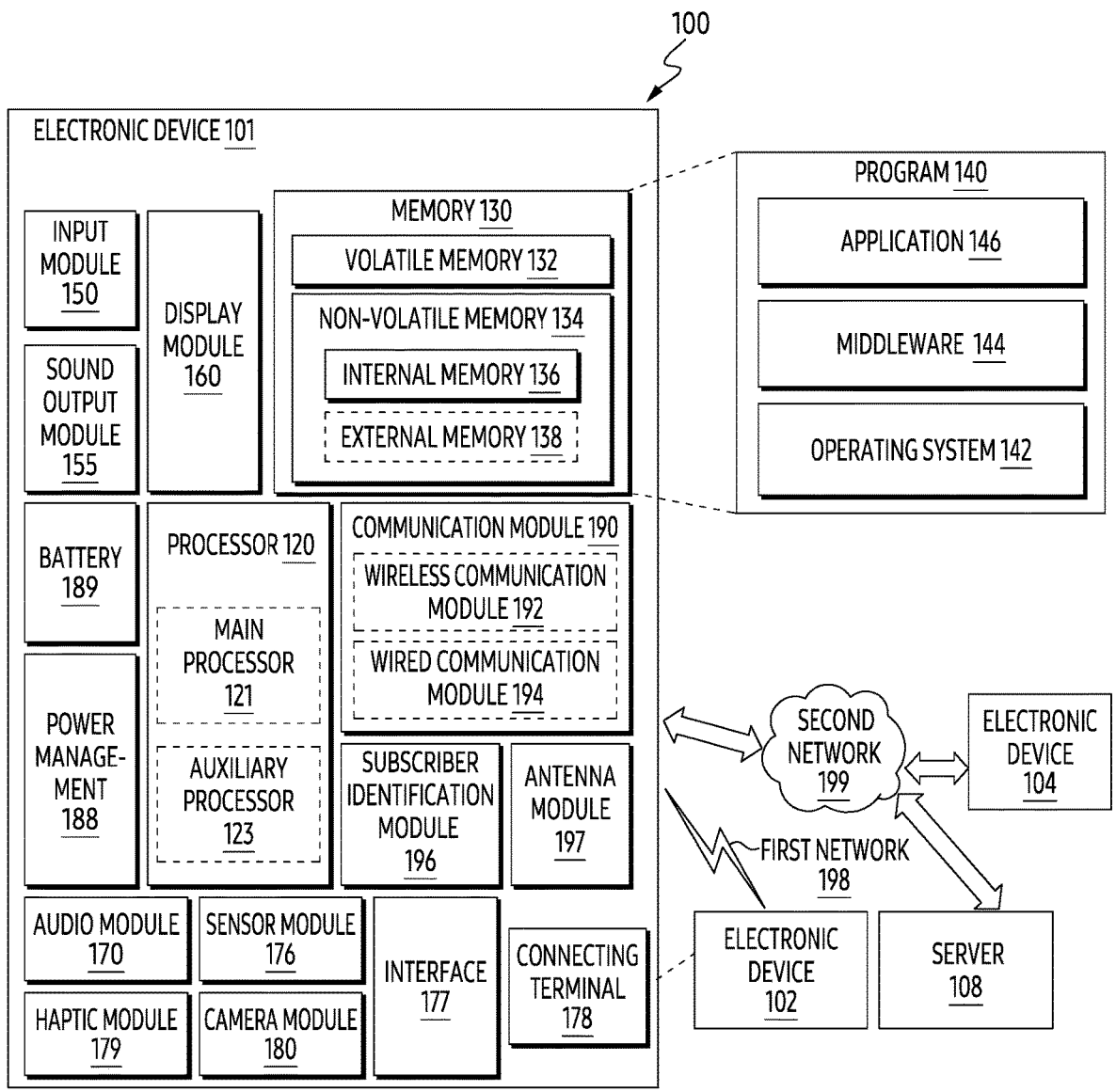
FIG. 1 is a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134. The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen). The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator. The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC). The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
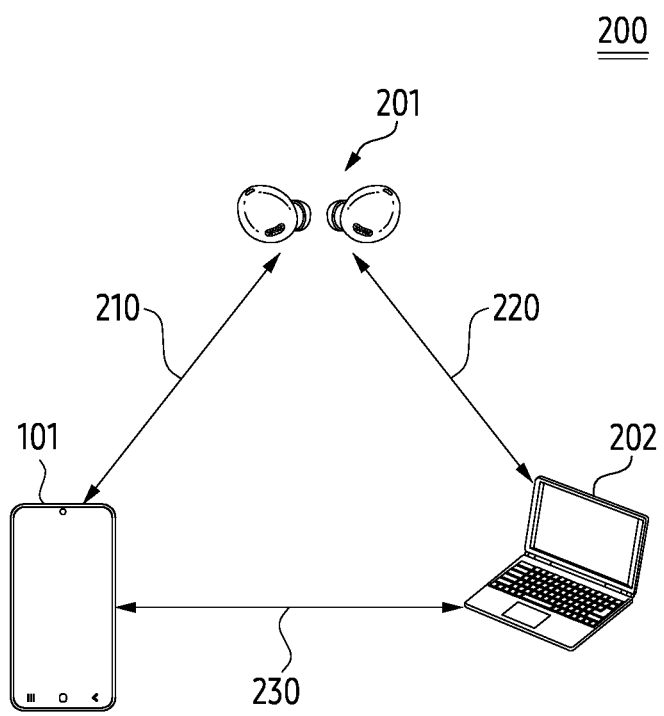
FIG. 2 illustrates an example of a wireless environment including an electronic device according to various embodiments.

FIG. 2 illustrates an example of a wireless environment including an electronic device according to various embodiments.

Referring to FIG. 2, the wireless environment 200 may include an electronic device 101, an electronic device 201, and an electronic device 202.

The electronic device 101 in the wireless environment 200 may be an audio source device such as a smartphone, a laptop computer, and a tablet PC. The electronic device 101 may transmit data on audio being played in the electronic device 101 to the electronic device 201. For example, the data may be usable in the electronic device 201 to output audio from the electronic device 201. In an embodiment, the electronic device 101 may be referred to as a master device. In an embodiment, the electronic device 101 may be referred to as the first external electronic device 101 in terms of being located outside the electronic device 201.

The electronic device 202 in the wireless environment 200 may be an audio source device such as a smartphone, a laptop computer, and a tablet PC. The electronic device 202 may transmit data on an audio being played in the electronic device 202 to the electronic device 201. For example, the electronic device 202 may play audio while the first external electronic device 101 also plays audio. For example, while the first external electronic device 101 transmits data on the audio played in the first external electronic device 101 to the electronic device 201 through a communication link 210 (hereinafter, referred to as the first communication link 210) between the first external electronic device 101 and the electronic device 201, the electronic device 202 may transmit data on the audio played in the electronic device 202 to the electronic device 201 through a communication link 220 (hereinafter referred to as the second communication link 220) between the electronic device 202 and the electronic device 201. In various embodiments, the electronic device 202 may include components such as components of electronic device 101 illustrated in FIG. 1. In an embodiment, the electronic device 202 may be referred to as a master device distinguished from the first external electronic device 101, which is a master device. In an embodiment, the electronic device 202 may be referred to as the second external electronic device 202 in terms of being located outside the electronic device 201.

In an embodiment, the second external electronic device 202 may transmit data to the first external electronic device 101 through a communication link 230 (hereinafter, referred to the third communication link 230) between the first external electronic device 101 and the second external electronic device 202, or receive data from the first external electronic device 101 through the third communication link 230.

The electronic device 201 in the wireless environment 200 may be audio sink devices such as earbuds or earphones. For example, the electronic device 201 may be configured as a pair of earbuds or earphones. However, it is not limited thereto. In embodiments where the electronic device 201 is a pair of earbuds or earphones, the electronic device 201 may be configured to play audio associated with a first external electronic device 101 though one earbud and audio associated with the second external electronic device 202 though the other earbud. In example, the electronic device 201 may receive the data from the first external electronic device 101 and output audio through a speaker of the electronic device 201 based on the data. The electronic device 201 may receive the data from the second external electronic device 202 and output audio through a speaker of the electronic device 201 based on the data. The electronic device 201 may be referred to as a slave device.

In an embodiment, the first external electronic device 101, the electronic device 201, and the second external electronic device 202 may support multi-stream audio. For example, synchronized, independent and multiple audio streams may be transmitted between the first external electronic device 101 and the electronic device 201 and/or between the second external electronic device 202 and the electronic device 201. For example, in order to support the multi-stream audio, a connected isochronous stream (CIS) or a connected isochronous group (CIG) including the CISs may be used. However, it is not limited thereto.

For example, the CIS may be a logical transport causing the first external electronic device 101, the electronic device 201, and the second external electronic device 202 to transmit isochronous data unidirectionally or bidirectionally. For example, the CIS may be related to an asynchronous connection-less (ACL). For example, the CIS may support packets of variable size and may support transmitting one or more packets within an isochronous event. For example, the CIG may consist of two or more CISs having a same ISO (isochronous) interval. However, it is not limited thereto.

An electronic device that is an audio sink device may receive a packet including audio data from a first external electronic device using first time resources allocated from the first external electronic device that is an audio source device, and a packet including audio data from a second external electronic device using second time resources allocated from the second external electronic device that is another audio source device. Since the second external electronic device allocates the second time resources to the electronic device without considering the first time resources allocated from the first external electronic device, at least a portion of the second time resources may overlap at least a portion of the first time resources. The overlap of at least a portion of the first time resources and at least a portion of the second time resources may reduce reception performance of the electronic device.

Figure 3:
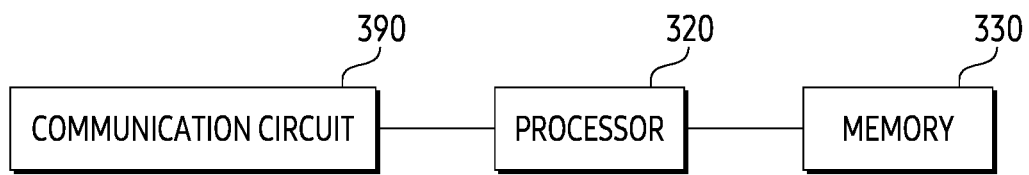
FIG. 3 is a simplified block diagram of an electronic device according to various embodiments.

FIG. 3 is a simplified block diagram of an electronic device according to various embodiments. Components indicated by the block diagram may be included in the electronic device 201 illustrated in FIG. 2.

Figure 4A:
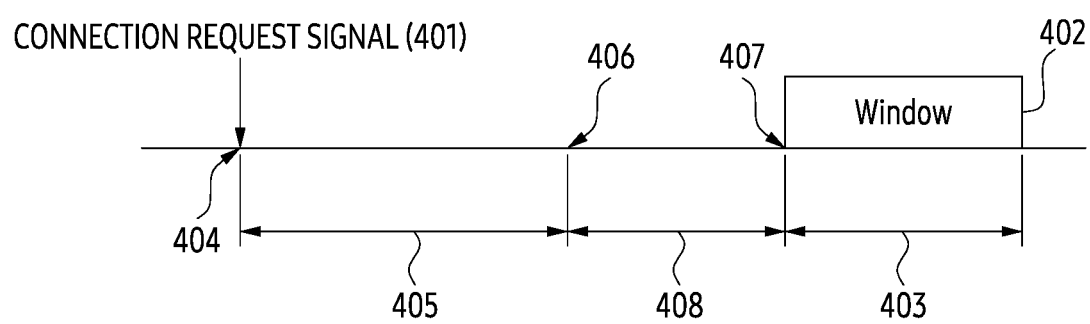
FIG. 4A illustrates an example of time resources indicated by information in a connection request signal according to an embodiment.

FIG. 4A illustrates an example of time resources indicated by information in a connection request signal according to an embodiment.

Figure 4B:
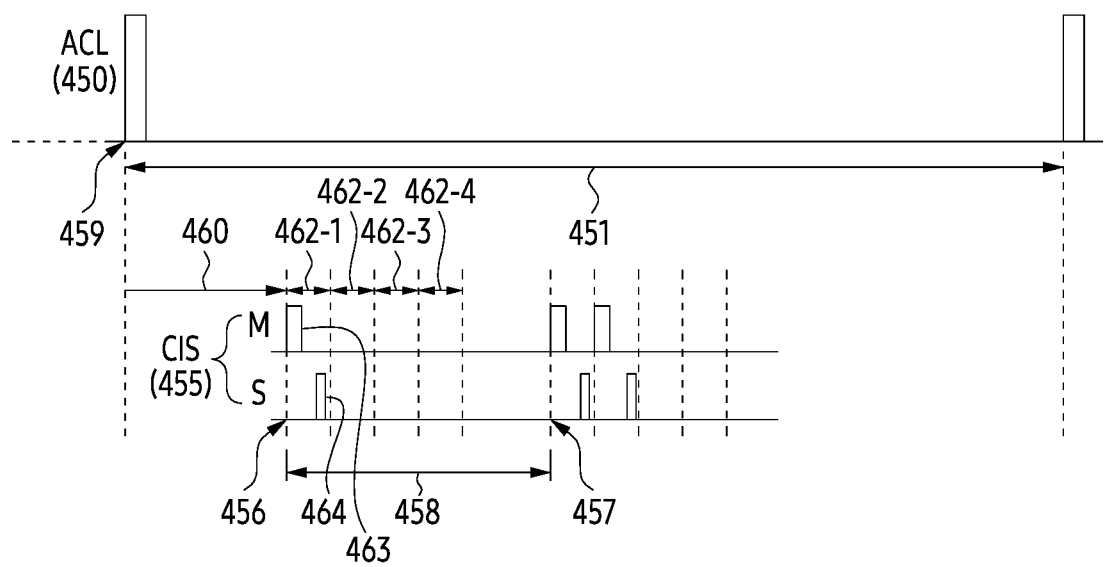
FIG. 4B illustrates an example of a communication link between an electronic device and an external electronic device according to an embodiment.

FIG. 4B illustrates an example of a communication link between an electronic device and an external electronic device according to an embodiment.

Figure 5A:
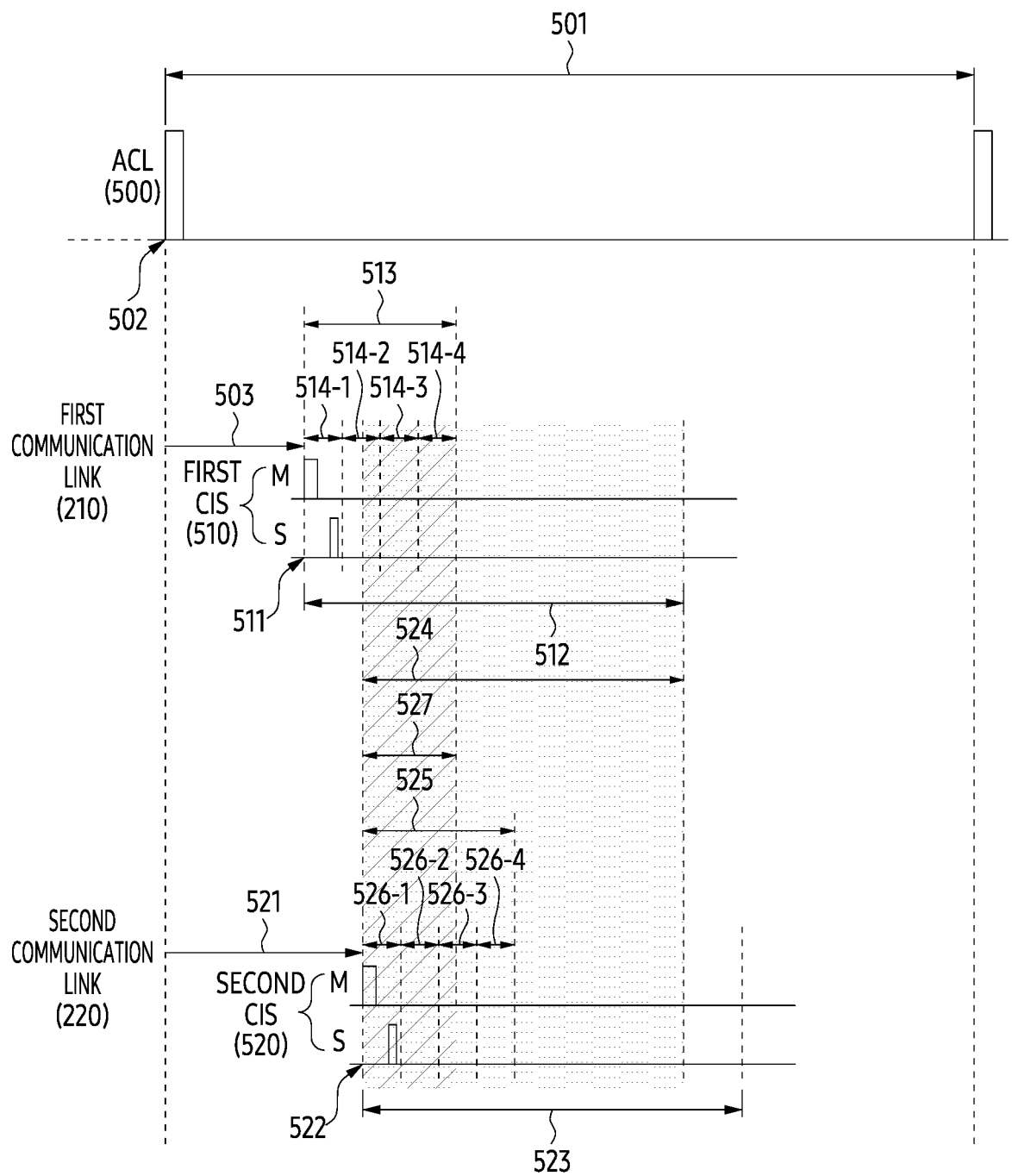
FIG. 5A illustrates an example in which at least a portion of a connection interval of a first communication link overlaps at least a portion of a connection interval of a second communication link.

FIG. 5A illustrates an example in which at least a portion of a connection interval of a first communication link overlaps at least a portion of a connection interval of a second communication link.

Figure 5B:
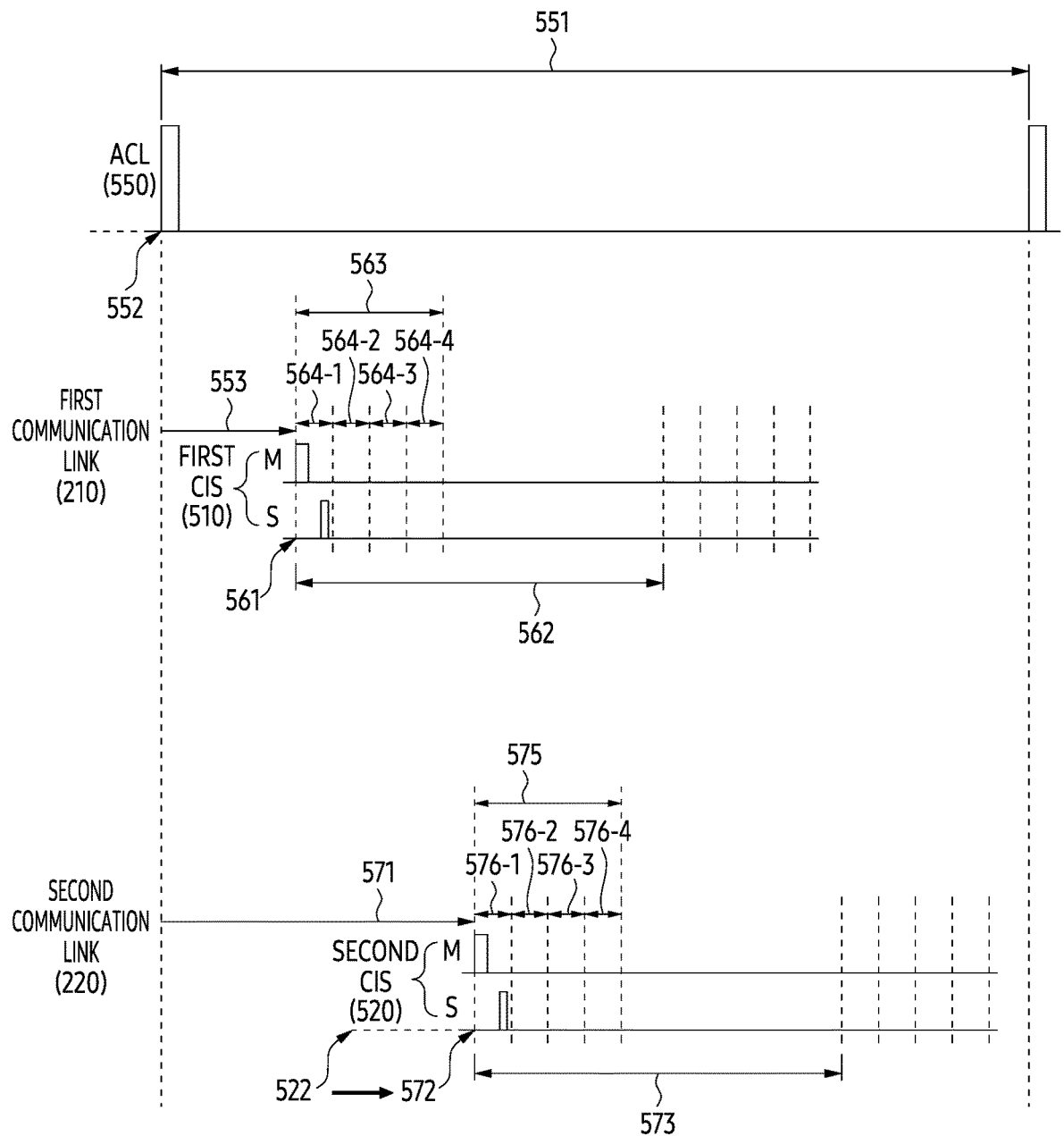
FIG. 5B illustrates an example in which a connection interval of a first communication link does not overlap at least a portion of a connection interval of a second communication link.

FIG. 5B illustrates an example in which a connection interval of a first communication link does not overlap at least a portion of a connection interval of a second communication link. Referring to FIG. 3, the electronic device 201 may include a processor 320, a memory 330, and a communication circuit 390. In embodiments where the electronic device 201 includes a pair of earbuds or earphones, each of the pair of devices may include a processor 320, a memory 330, and a communication circuit 390.

The processor 320 in the electronic device 201 may be operatively coupled to the memory 330 configured to store instructions. The processor 320 in the electronic device 201 may be operatively coupled to a communication circuit 390 used for communication with an external electronic device (e.g., the first external electronic device 101 and/or the second external electronic device 202).

In an embodiment, the processor 320 may broadcast an advertising signal to establish a communication link between the electronic device 201 and an external electronic device (e.g., the first external electronic device 101 and/or the second external electronic device 202). For example, the advertising signal may be used to scan the electronic device 201 by the external electronic device.

In an embodiment, the processor 320 may receive a connection request signal including information indicating time resources to be used to receive an initial packet to be transmitted from the external electronic device (e.g., the first external electronic device 101 and/or the second external electronic device 202) that has received the advertising signal. For example, the external electronic device may transmit the connection request signal to establish a communication link between the electronic device 201 and the external electronic device based on receiving the advertising signal. The information in the connection request signal may include data for indicating a length of a time interval in which the initial packet is transmitted and data for indicating an initiating timing of the time interval, in order to indicate the time resources. For example, referring to FIG. 4A, the connection request signal 401 received from the external electronic device receiving the advertising signal may include the information including data for indicating the size 403 of the window 402 to which the initial packet is to be transmitted, and data for indicating the time interval 408 between the timing 406 at which the predefined time interval 405 has elapsed from the timing 404 at which the connection request signal 401 is received and the timing 407 at which the window 402 is initiated. For example, the connection request signal 401 may be 'CONNECT_IND' of the Bluetooth core specification, the size 403 of the window 402 may be 'transmitWindowSize' of the Bluetooth core specification, the predefined time interval 405 may be 'transmitWindowDelay' of the Bluetooth core specification, and the time interval 408 may be 'transmitWindowOffset' of the Bluetooth core specification. However, it is not limited thereto. Referring back to FIG. 3, the processor 320 may receive the initial packet from the external electronic device using the time resources indicated by the information in the connection request signal, and identify an initiating timing (e.g., an anchor point) of a connection interval of a communication link between the external electronic device and the electronic device 201 based on a timing of receiving the initial packet. For example, the processor 320 may establish the first communication link 210 based on receiving the initial packet from the first external electronic device 101 and identify a connection interval of the first communication link 210. For another example, the processor 320 may establish a second communication link 220 based on receiving the initial packet from the second external electronic device 202 and identify a connection interval of the second communication link 220.

In an embodiment, each of the first communication link 210 and the second communication link 220 may be a communication link for an asynchronous connection-less (ACL). For example, referring to FIG. 4B, the processor 320 may establish a communication link 450 for an ACL as the first communication link 210 or the second communication link 220 based on receiving the connection request signal from the first external electronic device 101 or the second external electronic device 202. The communication link 450 for the ACL may include a connection interval 451.

Referring back to FIG. 3, each of the first communication link 210 and the second communication link 220 may be a communication link for a CIS. For example, referring to FIG. 4B, the processor 320 may establish a communication link 450 for the ACL and establish a communication link 455 for the CIS based on the connection request signal received from the first external electronic device 101 or the second external electronic device 202 through the established communication link 450. For example, the communication link 455 for the CIS may be defined within the connection interval 451. For example, the communication link 455 for the CIS may include a CIS ISO interval 458 defined as a time interval between the anchor point 456 of the CIS and the anchor point 457 of the CIS immediately after the anchor point 456. In an embodiment, the CIS ISO interval 458 may be defined from a timing (e.g., an anchor point 456) at which a time interval 460 corresponding to the CIS offset has elapsed from the initiating timing 459 of the connection interval 451. In an embodiment, the CIS event may occur within the CIS ISO interval 458. In an embodiment, the CIS event may include a plurality of sub-events. For example, the plurality of sub-events including a sub-event 462-1, a sub-event 462-2, a sub-event 462-3 and a sub-event 462-4 may occur in the CIS ISO interval 458. Within each of the plurality of sub-events, the first external electronic device 101 or the second external electronic device 202 as the master device may transmit a packet 463 including data on audio played in the first external electronic device 101 or the second external electronic device 202 to the electronic device 201 as the slave device through a communication link 455, and the electronic device 201 may transmit a response packet 464 to the packet 463 to the first external electronic device 101 or the second external electronic device 202 through the communication link 455. For example, the response packet 464 may be an acknowledgement signal indicating that the packet 463 is successfully received or a non-acknowledgement signal indicating that the packet 463 is not successfully received. However, it is not limited thereto.

Referring back to FIG. 3, the processor 320 may identify time resources that are to be used or used, also referred to herein as being allocated to, for the first communication link 210 or the second communication link 220. For example, the processor 320 may identify the time resources to be used for the first communication link 210 or the second communication link 220 based on the information in the connection request signal received before establishing the first communication link 210 or the second communication link 220. For another example, after establishing the first communication link 210 or the second communication link 220, the processor 320 may identify the time resources to be used or used for the first communication link 210 or the second communication link 220 based on the anchor point of the first communication link 210 or the second communication link 220 and the length of the connection interval of the first communication link 210 or the second communication link 220. For another example, when the first communication link 210 or the second communication link 220 is a communication link for the CIS, the processor 320 may identify the time resources to be used or used for the first communication link 210 or the second communication link 220 based on at least one of a length of the CIS ISO interval, an anchor point of the CIS event generated through the first communication link 210 or the second communication link 220, a number of sub-events included in the CIS event, a length of each of the sub-events, an arrangement of each of the sub-events, or a burst number(BN) of the CIS events. For another example, the processor 320 may identify the time resources to be used or used for the first communication link 210 or the second communication link 220 based on the type of service provided based on packets received through the first communication link 210 or the second communication link 220. For another example, the processor 320 may identify the time resources to be used or used for the first communication link 210 or the second communication link 220 based on the amount of resource of the first external electronic device 101 consumed to process the packet received through the first communication link 210 or the second communication link 220. For another example, the processor 320 may identify the time resources to be used or used for the first communication link 210 or the second communication link 220 based on a maximum transfer unit (MTU) of the packet received through the first communication link 210 or the second communication link 220. However, it is not limited thereto.

The processor 320 may identify whether at least a portion of the second time resources used or to be used for the second communication link 220 overlap at least a portion of the first time resources used for the first communication link 210.

For example, referring to FIG. 5A, the processor 320 may establish a communication link 510 for a first CIS, which is the first communication link 210, within a connection interval 501 of a communication link 500 for an ACL. The communication link 510 for the first CIS may have a first CIS ISO interval 512 initiated from an anchor point 511 of the first CIS where a time interval 503 corresponding to a first CIS offset has passed from the initiating timing 502 of the connection interval 501. The CIS event 513 generated in the first CIS ISO interval 512 may include a sub-event 514-1, a sub-event 514-2, a sub-event 514-3, and a sub-event 514-4. The processor 320 may receive a packet from the first external electronic device 101 through at least a portion of the sub-event 514-1, the sub-event 514-2, the sub-event 514-3, and the sub-event 514-4.

In an embodiment, while the communication link 510 for the first CIS is maintained, before establishing the communication link 520 for the second CIS, which is the second communication link 220, based on the connection request signal received from the second external electronic device 202, the processor 320 may identify the second time resources to be used for the communication link 520 for the second CIS, and may identify that at least a portion of the second time resources overlap at least a portion of the first time resources. For example, the processor 320 may identify the anchor point 522 of the second CIS in which the time interval 521 corresponding to the second CIS offset has elapsed from the initiating timing 502 of the connection interval 501 and the second CIS ISO interval 523 initiated from the anchor point 522 of the second CIS based on the connection request signal, and identify that a portion of the second time resources overlap a portion of the first time resources within the time interval 524 based on the anchor point 522 and the second CIS ISO interval 523 of the second CIS. For another example, the processor 320 may identify a length of each of the sub-event 526-1, the sub-event 526-2, the sub-event 526-3, and the sub-event 526-4 in the CIS event 525 generated in the second CIS ISO interval 523, and a number of a plurality of sub-events including the sub-event 526-1, the sub-event 526-2, the sub-event 526-3, and the sub-event 526-4 based on the above connection request signal, and identify that a portion of the second time resources overlap a portion of the first time resources within the time interval 527 based on the number of the plurality of sub-events and the length of each of the sub-events 526-1, the sub-events 526-2, the sub-events 526-3 and the sub-events 526-4 in the CIS event 525.

In an embodiment, while the communication link 510 for the first CIS is maintained, after establishing the communication link 520 for the second CIS, the processor 320 may identify that a portion of the second time resources overlap a portion of the first time resources within the time interval 524 or the time interval 527, based on at least one of the anchor point 522 of the second CIS, the second CIS ISO interval 523, a length of each the sub-event 526-1, the sub-event 526-2, the sub-event 526-3, and the sub-event 526-4 within the CIS event 525, or the number of the plurality of sub-events including the sub-event 526-1, the sub-event 526-2, the sub-event 526-3, and the sub-event 526-4.

For another example, referring to FIG. 5B, the processor 320 may establish a communication link 560 for a first CIS, which is a first communication link 210 within a connection interval 551 of a communication link 550 for an ACL. The communication link 560 for the first CIS may have a first CIS ISO interval 562 initiated from an anchor point 561 of the first CIS where a time interval 553 corresponding to the first CIS offset has passed from the initiating timing 502 of the connection interval 551. The CIS event 563 generated in the first CIS ISO interval 562 may include a sub-event 564-1, a sub-event 564-2, a sub-event 564-3, and a sub-event 564-4. The processor 320 may receive a packet from the first external electronic device 101 through at least a portion of the sub-event 564-1, the sub-event 564-2, the sub-event 564-3, and the sub-event 564-4.

In an embodiment, the processor 320 may identify the second time resources to be used for the communication link 570 for the second CIS, and may identify that the second time resources do not overlap the first time resources while the communication link 560 for the first CIS is maintained, before establishing the communication link 570 for the second CIS, which is the second communication link 220, based on the connection request signal received from the second external electronic device 202. For example, the processor 320 may identify a length of each of the sub-event 576-1, the sub-event 576-2, the sub-event 576-3, and the sub-event 576-4 in the CIS event 575 generated in the second CIS ISO interval 573 and a number of a plurality of sub-events including the sub-event 576-1, the sub-event 576-2, the sub-event 576-3, and the sub-event 576-4, based on the connection request signal and may identify that the second time resources do not overlap the first time resources based on the number of the plurality of sub-events and the length of each of the sub-events 576-1, the sub-events 576-2, the sub-events 576-3 and the sub-events 576-4 in the CIS event 575.

In an embodiment, after establishing the communication link 570 for the second CIS while the communication link 560 for the first CIS is maintained, the processor 320 may identify that the second time resources do not overlap the first time resources based on at least one of the anchor points 572 of the second CIS, the second CIS ISO interval 573, the length of each of the sub-event 576-1, the sub-event 576-2, the sub-event 576-3 and the sub-event 576-4 within the CIS event 575, or the number of the plurality of sub-events including the sub-event 576-1, the sub-event 576-2, the sub-event 576-3, and the sub-event 576-4.

Referring back to FIG. 3, the processor 320 may execute at least one operation so that the second time resources do not overlap the first time resources.

In an embodiment, the processor 320 may broadcast a first advertising signal. The processor 320 may receive, from the first external electronic device 101, the connection request signal including information indicating time resources to be used to receive the initial packet to be transmitted from the first external electronic device 101, after broadcasting the first advertising signal. For example, the connection request signal may be transmitted based on the first advertising signal from the first external electronic device 101. The processor 320 may establish the first communication link 210, based on receiving the initial packet transmitted based on the time resources indicated by the information in the connection request signal from the first external electronic device 101. The processor 320 may broadcast a second advertising signal, based on establishing the first communication link 210. For example, the second advertising signal may further include information indicating time resources used for the first communication link 210, with respect to the first advertising signal. For example, the information further included in the second advertising signal with respect to the first advertising signal may include data for indicating a connection interval of the first communication link 210. For example, when the first communication link 210 is a communication link for the CIS, the information further included in the second advertising signal with respect to the first advertising signal may include data on at least one of an anchor point of the CIS, a CIS ISO time interval, a number of sub-events in a CIS event generated within the CIS ISO time interval, or a length of each of the sub-events. For example, the information further included in the second advertising signal with respect to the first advertising signal may include data on a maximum transfer unit of a packet received from the first external electronic device 101 through the first communication link 210. For example, the information further included in the second advertising signal with respect to the first advertising signal may include data on a type of service (e.g., media service or voice service) provided based on the packet received from the first external electronic device 101 through the first communication link 210. For example, the information further included in the second advertising signal with respect to the first advertising signal may include data on the amount of resource of the first external electronic device 101 consumed to process the packet received from the first external electronic device 101 through the first communication link 210. However, it is not limited thereto. According to embodiments, the processor 320 may transmit the first advertising signal after establishing the first communication link 210.

In an embodiment, while the first communication link 210 is maintained, the processor 320 may receive, from the second external electronic device 202, another connection request signal including information indicating time resources to be used to receive the initial packet transmitted from the second external electronic device 202 based on the second advertising signal (or the first advertising signal) and to be transmitted from the second external electronic device 202. The processor 320 may compare the time resources indicated by the information in the other connection request signal with the time resources used for the first communication link 210 based on receiving the other connection request signal. For example, the processor 320 may identify a size of a window transmitting the initial packet indicated by the information in the other connection request signal and an initiating timing of the window, and compare time resources identified based on the size of the window and the initiating timing of the window with the time resources used for the first communication link 210. As a result of the comparison, the processor 320 may establish the second communication link 220 by receiving the initial packet based on identifying that the time resources to be used to receive the initial packet do not overlap the time resources used for the first communication link 210. As the result of the comparison, the processor 320 may refrain from establishing the second communication link 220 by bypassing or refraining from receiving the initial packet based on identifying that at least a portion of the time resources to be used to receive the initial packet overlap at least a portion of the time resources used for the first communication link 210.

In an embodiment, while the first communication link 210 is maintained, the processor 320 may receive, from the second external electronic device 202, another connection request signal including information indicating time resources to be used to receive the initial packet transmitted from the second external electronic device 202 based on the second advertising signal (or the first advertising signal) and to be transmitted from the second external electronic device 202. The processor 320 may establish the second communication link 220 based on receiving the initial packet transmitted from the second external electronic device 202 based on the time resources indicated by the information in the other connection request signal. The processor 320 may identify the time resources used for the second communication link 220 while establishing the second communication link 220 or after establishing the second communication link 220. For example, the processor 320 may identify the time resources by identifying the connection interval of the second communication link 220. For example, when the second communication link 220 is the communication link for the CIS, the processor 320 may identify the time resources used for the second communication link 220 by identifying at least one of the anchor points of the CIS, the CIS ISO time interval, the number of sub-events in the CIS event caused within the CIS ISO time interval, or the length of each of the sub-events. The processor 320 may compare the time resources used for the second communication link 220 with the time resources used for the first communication link 210. As a result of the comparison, the processor 320 may receive at least one packet transmitted from the second external electronic device 202 through the second communication link 220 based on identifying that the time resources used for the second communication link 220 do not overlap the time resources used for the first communication link 210. As a result of the comparison, the processor 320 may bypass or refrain from receiving at least one packet transmitted from the second external electronic device 202 through the second communication link 220 based on identifying that at least a portion of the time resources used for the second communication link 220 overlap at least a portion of the time resources used for the first communication link 210.

In an embodiment, as the result of the comparison, the processor 320 may transmit a request signal for adjusting the time resources used for the first communication link 210 to the first external electronic device 101 or transmit a request signal for adjusting the time resources used for the second communication link 220 to the second external electronic device 202 based on identifying that at least a portion of the time resources used for the second communication link 220 overlap at least a portion of the time resources used for the first communication link 210. For example, referring to FIGS. 5A and 5B, within the time interval 527, the processor 320 may transmit the request signal for changing (or adjusting) the anchor point 522 of the second CIS to the anchor point 572 of the second CIS to the second external electronic device 202 based on identifying that at least a portion of the time resources used for the first communication link 210 overlap with at least a portion of the time resources used for the second communication link 220. Based on the transmitting of the request signal, the time resources used for the first communication link 210 may not overlap the time resources used for the second communication link 220.

For example, as the result of the comparison, in response to identifying that at least a portion of the time resources used for the second communication link 220 overlap at least a portion of the time resources used for the first communication link 210, the processor 320 may identify a type of the first service provided based on at least one packet received from the first external electronic device 101 through the first communication link 210 and a type of the second service provided based on at least one packet received from the second external electronic device 202 through the second communication link 220, and identify the priority of the first service based on the type of the first service and identify the priority of the second service based on the type of the second service. The processor 320 may transmit the request signal to the second external electronic device 202 based on identifying that the priority of the first service is higher than or equal to the priority of the second service, and transmit the request signal to the first external electronic device 101 based on identifying that the priority of the first service is lower than the priority of the second service. For example, the request signal transmitted to the second external electronic device 202 may include data on the time resources used for the first communication link 210 or data on time resources that do not overlap the time resources used for the first communication link 210. For example, the request signal transmitted to the first external electronic device 101 may include data on the time resources used for the second communication link 220 or data on time resources that do not overlap the time resources used for the second communication link 220. However, it is not limited thereto.

For another example, as the result of the comparison, in response to identifying that at least a portion of the time resources used for the second communication link 220 overlap at least a portion of the time resources used for the first communication link 210, the processor 320 may compare the amount of first resources (or amount of load) of the first external electronic device 101 consumed to process at least one packet received from the first external electronic device 101 through the first communication link 210, with the amount of the second resources of the first external electronic device 101 consumed to process at least one packet received from the second external electronic device 202 through the second communication link 220. The processor 320 may transmit the request signal to the second external electronic device 202 based on identifying that the amount of the first resources is greater than or equal to the amount of the second resources, and transmit the request signal to the first external electronic device 101 based on identifying that the amount of the first resources is less than the amount of the second resources. For example, the request signal transmitted to the second external electronic device 202 may include data on the time resources used for the first communication link 210 or data on time resources that do not overlap the time resources used for the first communication link 210. For example, the request signal transmitted to the first external electronic device 101 may include data on the time resources used for the second communication link 220 or data on time resources that do not overlap the time resources used for the second communication link 220. However, it is not limited thereto.

For another example, as the result of the comparison, in response to identifying that at least a portion of the time resources used for the second communication link 220 overlap at least a portion of the time resources used for the first communication link 210, the processor 320 may compare a distance between the first external electronic device 101 and the electronic device 201 with a distance between the second external electronic device 202 and the electronic device 201. The processor 320 may transmit the request signal to the second external electronic device 202 based on identifying that the distance between the first external electronic device 101 and the electronic device 201 is shorter than or equal to the distance between the second external electronic device 202 and the electronic device 201, and transmit the request signal to the first external electronic device 101 based on identifying that the distance between the first external electronic device 101 and the electronic device 201 is greater than the distance between the second external electronic device 202 and the electronic device 201. For example, the request signal transmitted to the second external electronic device 202 may include data on the time resources used for the first communication link 210 or data on time resources that do not overlap the time resources used for the first communication link 210. For example, the request signal transmitted to the first external electronic device 101 may include data on the time resources used for the second communication link 220 or data on time resources that do not overlap the time resources used for the second communication link 220. However, it is not limited thereto.

For another example, as the result of the comparison, in response to identifying that at least a portion of the time resources used for the second communication link 220 overlap at least a portion of the time resources used for the first communication link 210, the processor 320 may compare the quality of the first communication link 210 with the quality of the second communication link 220. The processor 320 may transmit the request signal to the second external electronic device 202 based on identifying that the quality of the first communication link 210 is better than or equal to the quality of the second communication link 220, and transmit the request signal to the first external electronic device 101 based on identifying that the quality of the first communication link 210 is worse than the quality of the second communication link 220. For example, the request signal transmitted to the second external electronic device 202 may include data on the time resources used for the first communication link 210 or data on time resources that do not overlap the time resources used for the first communication link 210. For example, the request signal transmitted to the first external electronic device 101 may include data on the time resources used for the second communication link 220 or data on time resources that do not overlap the time resources used for the second communication link 220. However, it is not limited thereto. In an embodiment, the processor 320 may establish the first communication link 210, transmit the first advertising signal while the first communication link 210 is maintained, receive, from the second external electronic device 202, a connection request signal including information indicating time resources to be used to receive the initial packet to be transmitted from the second external electronic device 202 based on the first advertising signal, and compare time resources indicated by the information with time resources used for the first communication link 210. As the result of the comparison, the processor 320 may establish the second communication link 220 by receiving the initial packet from the second external electronic device 202 based on identifying that the time resources indicated by the information do not overlap the time resources used for the first communication link 210. As the result of the comparison, processor 320 may bypass or refrain from establishing the second communication link 220 by bypassing or refraining from receiving the initial packet from the second external electronic device 202 based on identifying that at least a portion of the time resources indicated by the information overlap at least a portion of the time resources used for the first communication link 210.

In an embodiment, the processor 320 may establish the first communication link 210, transmit the first advertising signal while the first communication link 210 is maintained, receive, from the second external electronic device 202, the connection request signal including information indicating time resources to be used to receive the initial packet to be transmitted from the second external electronic device 202 based on the first advertising signal, and establish the second communication link 220 by receiving the initial packet transmitted based on the time resources indicated by the information from the second external electronic device 202. The processor 320 may compare time resources used for the first communication link 210 with time resources used for the second communication link 220 while the first communication link 210 and the second communication link 220 are maintained. The processor 320 may receive, as the result of the comparison, as illustrated in FIG. 5B, at least one packet transmitted from the second external electronic device 202 through the second communication link 220 based on identifying that the time resources used for the first communication link 210 do not overlap the time resources used for the second communication link 220, and bypass or refrain from receiving the at least one packet based on identifying that at least a portion of the time resources used for the first communication link 210 overlap at least a portion of the time resources used for the second communication link 220, as the result of the comparison, as illustrated in FIG. 5A. For example, referring to FIG. 5A, the processor 320 may bypass or refrain from receiving the at least one packet received from the second external electronic device 202 in the time interval 524 or the time interval 527.

In an embodiment, as a result of the comparison, the processor 320 may transmit a request signal for adjusting the time resources used for the first communication link 210 to the first external electronic device 101 or transmit a request signal for adjusting the time resources used for the second communication link 220 to the second external electronic device 202, based on identifying that at least a portion of the time resources used for the first communication link 210 overlap at least a portion of the time resources used for the second communication link 220. For example, referring to FIGS. 5A and 5B, within the time interval 527, the processor 320 may transmit the request signal for changing the anchor point 522 of the second CIS to the anchor point 572 of the second CIS to the second external electronic device 202, based on identifying that at least a portion of the time resources used for the first communication link 210 overlap at least a portion of the time resources used for the second communication link 220. As illustrated in FIG. 5B, the time resources used for the first communication link 210 may not overlap the time resources used for the second communication link 220 based on the transmitting of the request signal. In an embodiment, the request signal may be transmitted at a timing when the electronic device 201 performs a service through the second communication link 220.

Figure 6:
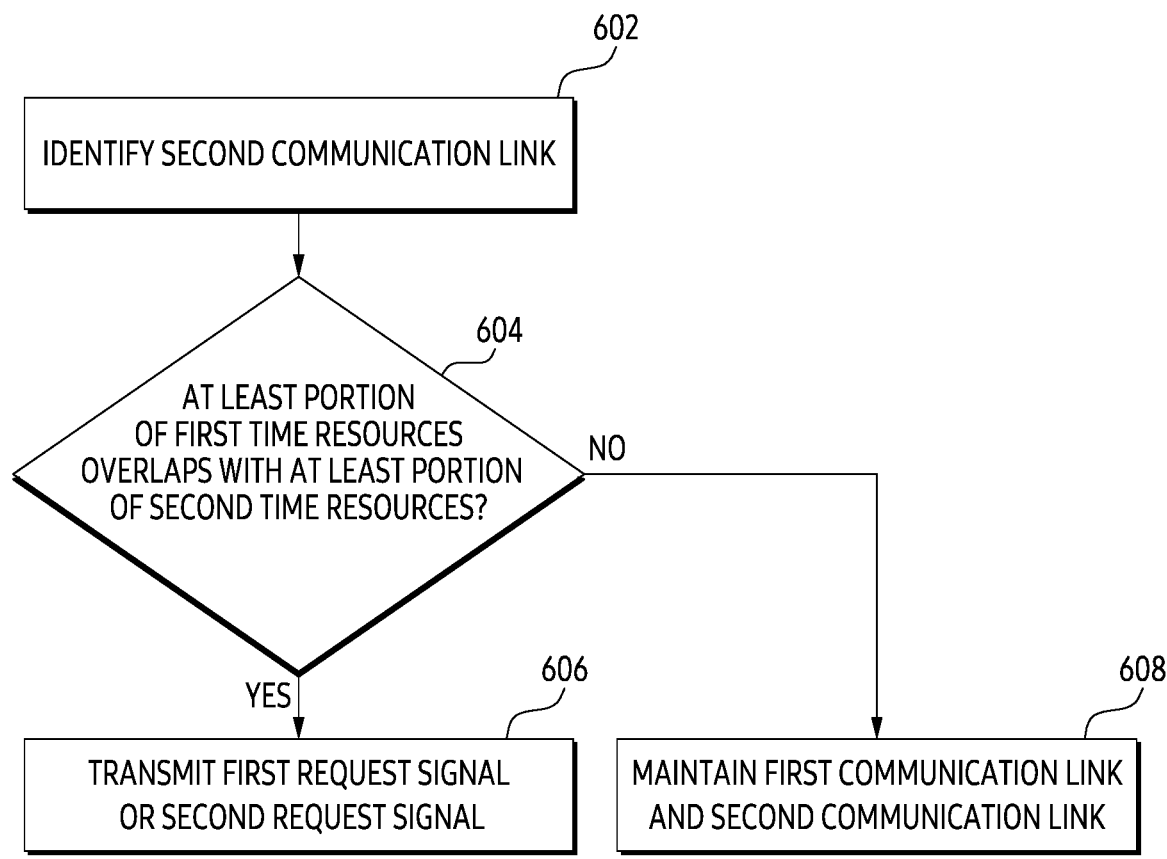
FIG. 6 is a flowchart illustrating a method of transmitting a request signal for adjusting time resources, according to an embodiment.

FIG. 6 is a flowchart illustrating a method of transmitting a request signal for adjusting time resources, according to an embodiment. This method may be executed by the electronic device 201 illustrated in FIG. 2, the electronic device 201 illustrated in FIG. 3, or the processor 320 of the electronic device 201.

Referring to FIG. 6, in operation 602, the processor 320 may identify a second communication link 220 with a second external electronic device (e.g., a second external electronic device 202) operating as a second master device with respect to the electronic device 201, while the first communication link 210 with the first external electronic device (e.g., the first external electronic device 101) operating as the first master device is maintained with respect to the electronic device 201. For example, the processor 320 may identify the second communication link 220 by establishing the second communication link 220 with the second external electronic device 202. For another example, the processor 320 may identify the second communication link 220, based on the connection request signal including information indicating time resources to be used to receive the initial packet transmitted from the second external electronic device 202 and to be transmitted from the second external electronic device 202 based on an advertising signal (e.g., the first advertising signal or the second advertising signal) broadcasted from the electronic device 201 before establishing the second communication link 220 with the second external electronic device 202. However, it is not limited thereto.

In operation 604, the processor 320 may identify whether at least a portion of the first time resources used for the first communication link 210 overlap at least a portion of the second time resources used for or to be used for the second communication link 220. For example, the processor 320 may identify whether at least a portion of the first time resources overlap at least a portion of the second time resources, by identifying the second time resources based on establishing the second communication link 220 and comparing the first time resources with the second time resources. For another example, the processor 320 may identify the second time resources to be used for the second communication link 220 based on the connection request signal before establishing the second communication link 220, and identify whether at least a portion of the first time resources overlaps at least a portion of the second time resources. However, it is not limited thereto.

In an embodiment, the processor 320 may identify whether at least a portion of the first time resources overlap at least a portion of the second time resources by identifying the first time resources and the second time resources by using methods defined through the description of FIGS. 3 to 5B, and comparing the identified first time resources with the identified second time resources. The processor 320 may execute operation 606 on a condition that at least a portion of the first time resources overlap at least a portion of the second time resources, otherwise the processor 320 executes operation 608.

In operation 606, the processor 320 may transmit a first request signal for adjusting the first time resources to the first external electronic device 101 or transmit a second request signal for adjusting the second time resources to the second external electronic device 202 based on identifying that at least a portion of the first time resources overlap at least a portion of the second time resources. For example, in response to identifying that at least a portion of the first time resources overlap at least a portion of the second time resources, the processor 320 may transmit the first request signal to the first external electronic device 101 or transmit the second request signal to the second external electronic device 202, based on at least one of a state of the electronic device 201, a state of the first external electronic device 101, a state of the second external electronic device 202, a state of the packet transmitted from the first external electronic device 101, or a state of the packet transmitted from the second external electronic device 202.

In an embodiment, the processor 320 may identify whether to transmit the first request signal or transmit the second request signal, based on the type of the first service provided by the first external electronic device 101 and the type of the second service provided by the second external electronic device 202. For example, when the priority of the first service is higher than the priority of the second service, the second request signal among the first request signal and the second request signal may be transmitted from the electronic device 201 to the second external electronic device 202. For another example, when the priority of the first service is equal to or lower than the priority of the second service, the first request signal among the first request signal and the second request signal may be transmitted from the electronic device 201 to the first external electronic device 101. In exemplary embodiments, the priority associated with each type of service may be specified by a user to the electronic device and stored in a user profile. For example, a user may assign a highest priority level to voice call service type, a second priority level to alerts and/or notifications service type, and a third, or lowest, priority level to a music service type.

In an embodiment, the processor 320 may identify whether to transmit the first request signal or transmit the second request signal, based on the amount of first resources of the electronic device 201 consumed to process at least one packet received from the first external electronic device 101 and the amount of second resources of the electronic device 201 consumed to process at least one packet received from the second external electronic device 202. For example, when the amount of the first resources is greater than the amount of the second resources, the second request signal among the first request signal and the second request signal may be transmitted from the electronic device 201 to the second external electronic device 202. For another example, when the amount of the first resources is equal to or less than the amount of the second resources, the first request signal among the first request signal and the second request signal may be transmitted from the electronic device 201 to the first external electronic device 101.

In an embodiment, the processor 320 may identify whether to transmit the first request signal or transmit the second request signal based on the quality of the first communication link 210 and the quality of the second communication link 220. For example, when the quality of the first communication link 210 is better than the quality of the second communication link 220, the second request signal among the first request signal and the second request signal may be transmitted from the electronic device 201 to the second external electronic device 202. For another example, when the quality of the first communication link 210 is equal to or worse than the quality of the second communication link 220, the first request signal among the first request signal and the second request signal may be transmitted from the electronic device 201 to the first external electronic device 101.

In an embodiment, a timing at which the first request signal or the second request signal is transmitted may be variously defined. For example, the first request signal or the second request signal may be transmitted in response to establishing the second communication link 220. For another example, the first request signal or the second request signal may be transmitted in response to initiating a service through the second communication link 220 after establishing the second communication link 220. However, it is not limited thereto.

In operation 608, the processor 320 may maintain the first communication link 210 and the second communication link 220 based on identifying that the first time resources do not overlap the second time resources. For example, without the adjustment of the first time resources or the second time resources, the processor 320 may receive at least one packet from the first external electronic device 101 through the first communication link 210 and at least one packet from the second external electronic device 202 through the second communication link 220, since the fact that first time resources and the second time resources do not overlap each other may mean that the reception quality of at least one packet transmitted from the first external electronic device 101 through the first communication link 210 is not reduced by receiving at least one packet transmitted from the second external electronic device 202 through the second communication link 220.

As described above, when at least a portion of the connection interval of the first communication link 210 overlap at least a portion of the connection interval of the second communication link 220, the electronic device 201 may enhance the quality of communication with the first external electronic device 101 and communication with the second external electronic device 202, by transmitting a request signal for moving (or adjusting) the connection interval of the first communication link 210 or moving (or adjusting) the connection interval of the second communication link 220 to the first external electronic device 101 or the second external electronic device 202.

Figure 7:
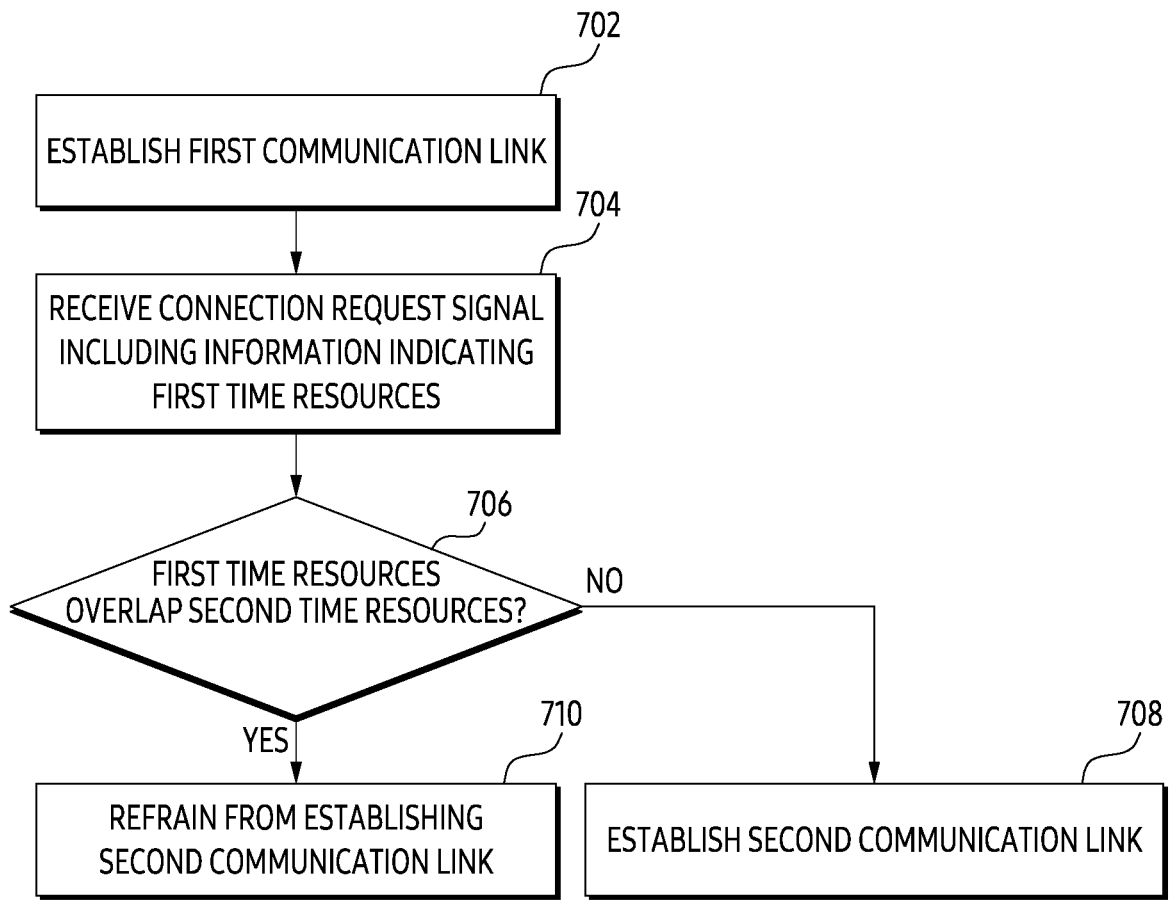
FIG. 7 is a flowchart illustrating a method of identifying whether to establish a second communication link, according to an embodiment.

FIG. 7 is a flowchart illustrating a method of identifying whether to establish a second communication link, according to an embodiment. This method may be executed by the electronic device 201 illustrated in FIG. 2, the electronic device 201 illustrated in FIG. 3, or the processor 320 of the electronic device 201.

Referring to FIG. 7, in operation 702, the processor 320 may establish a first communication link (e.g., a first communication link 210) between the first external electronic device (e.g., a first external electronic device 101) and the electronic device 201.

In operation 704, the processor 320 may receive, from the second external electronic device, a connection request signal including information indicating first time resources to be used to receive the initial packet transmitted from the second external electronic device (e.g., the second external electronic device 202) and to be transmitted from the second external electronic device, based on the advertising signal (e.g., the first advertising signal defined by the description of FIG. 3) broadcasted from the electronic device 201 while the first communication link 210 is maintained. In operation 706, the processor 320 may identify whether the first time resources overlap the second time resources for at least one packet received from the first external electronic device through the first communication link 210 based on receiving the connection request signal. The processor 320 may execute operation 710 on a condition that at least a portion of the first time resources overlap at least a portion of the second time resources, otherwise execute operation 708. In operation 708, the processor 320 may establish a second communication link (e.g., a second communication link 220) between the second external electronic device 202 and the electronic device 201 based on identifying that the first time resources do not overlap the second time resources, by receiving the initial packet based on the first time resources. For example, the second communication link 220 may be a communication link distinguished from the first communication link 210. In an embodiment, the second communication link 220 may be used to receive a packet for providing a service distinguished from a service provided through a packet received through the first communication link 210. For example, since the connection interval of the second communication link 220 may not overlap the connection interval of the first communication link 210, the processor 320 may establish the second communication link 220.

In operation 710, the processor 320 may refrain from establishing the second communication link 220 by bypassing or refraining from receiving the initial packet based on the first time resources, based on identifying that at least a portion of the first time resources overlap at least a portion of the second time resources. For example, the processor 320 may refrain from establishing the second communication link 220, since the fact that at least a portion of the first time resources overlap at least a portion of the second time resources may mean that at least a portion of the connection interval of the first communication link 210 overlap at least a portion of the connection interval of the second communication link 220.

Although operation 710 of FIG. 7 illustrates an example of refraining from establishing the second communication link 220, the processor 320 may establish the second communication link 220 and release the first communication link 210. For example, when the priority of a packet transmitted through the first communication link 210 is lower than the priority of the packet transmitted through the second communication link 220, the processor 320 may release the first communication link 210 and establish the second communication link 220.

As described above, before establishing the second communication link 220, the electronic device 201 may identify a possibility that the connection interval of the second communication link 220 and the connection interval of the first communication link 210 overlap each other, and determine whether to establish the second communication link 220 based on the identification. The electronic device 201 may provide an enhanced service through such a decision.

Figure 8:
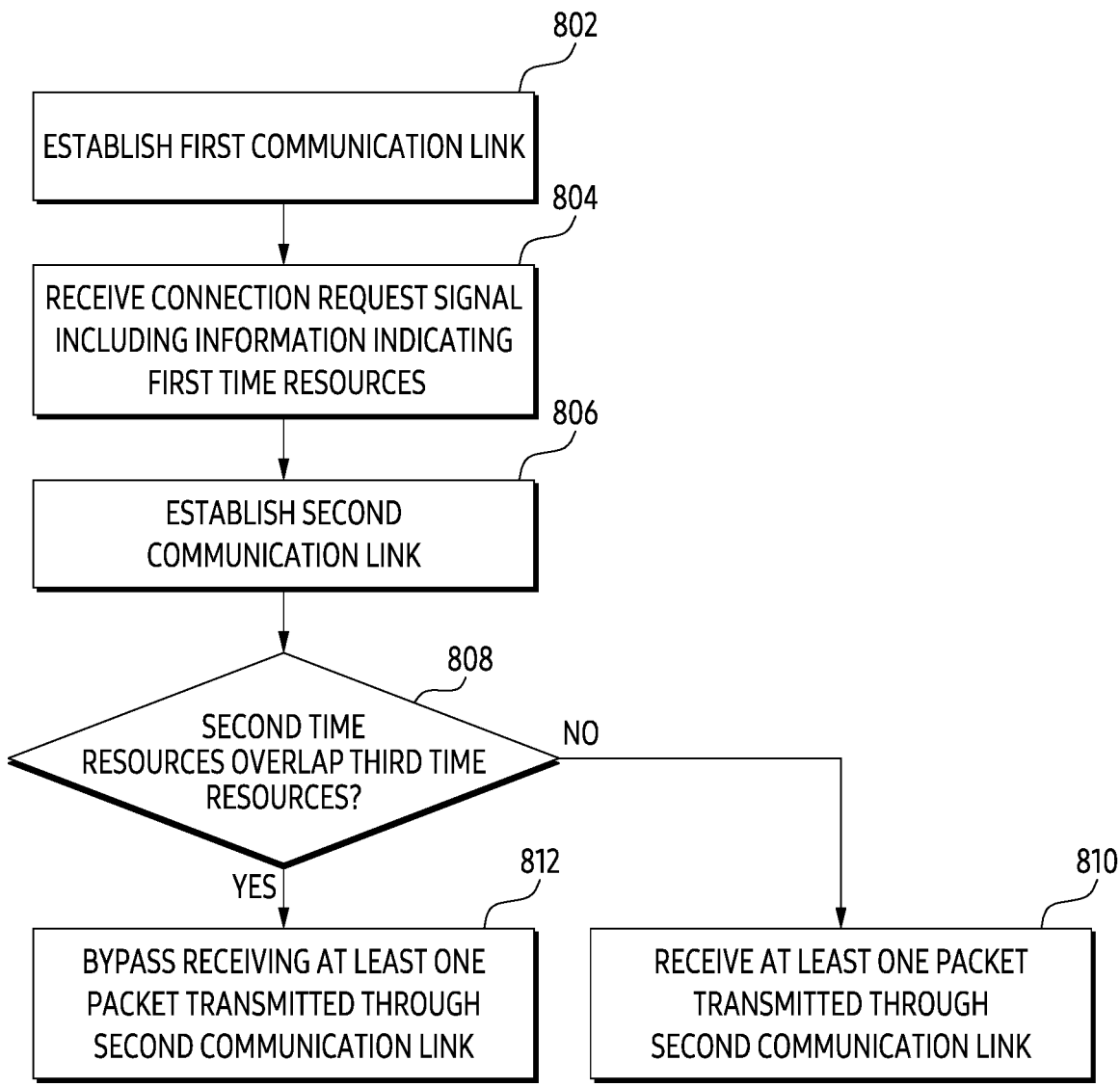
FIG. 8 is a flowchart illustrating a method of identifying whether to receive at least one packet received through a second communication link after establishing a second communication link, according to an embodiment.

FIG. 8 is a flowchart illustrating a method of identifying whether to receive at least one packet received through a second communication link after establishing a second communication link, according to an embodiment. This method may be executed by the electronic device 201 illustrated in FIG. 2, the electronic device 201 illustrated in FIG. 3, or the processor 320 of the electronic device 201.

Referring to FIG. 8, in operation 802, the processor 320 may establish a first communication link (e.g., a first communication link 210) between the first external electronic device (e.g., a first external electronic device 101) and the electronic device 201.

In operation 804, the processor 320 may receive, from the second external electronic device, a connection request signal including information indicating first time resources to be used to receive the initial packet transmitted from the second external electronic device (e.g., the second external electronic device 202) and to be transmitted from the second external electronic device, based on the advertising signal (e.g., the first advertising signal defined by the description of FIG. 3) broadcasted from the electronic device 201 while the first communication link 210 is maintained.

In operation 806, the processor 320 may establish a second communication link (e.g., a second communication link 220) between the second external electronic device 202 and the electronic device 201 based on receiving the initial packet from the second external electronic device 202 based on the first time resources.

In operation 808, the processor 320 may identify whether the second time resources used for the second communication link 220 overlap the third time resources used for the first communication link 210 based on establishing the second communication link 220. For example, the processor 320 may execute operation 812 on a condition that at least a portion of the second time resources overlap at least a portion of the third time resources, otherwise execute operation 810.

In operation 810, the processor 320 may receive at least one packet transmitted from the second external electronic device 202 through the second communication link 220, based on identifying that the second time resources do not overlap the third time resources. For example, since the fact that the second time resources do not overlap the third time resources may mean that the reception quality of at least one packet transmitted from the first external electronic device 101 through the first communication link 210 is not reduced by receiving at least one packet transmitted through the second communication link 220 from the second external electronic device 202, the processor 320 may receive at least one packet transmitted from the second external electronic device 202 through the second communication link 220.

In operation 812, the processor 320 may bypass receiving the at least one packet transmitted from the second external electronic device 202 through the second communication link 220 based on identifying that at least a portion of the second time resources overlap at least a portion of the third time resources. For example, since the fact that at least a portion of the second time resources overlap at least a portion of the third time resources may mean that reception quality of at least one packet transmitted from the first external electronic device 101 through the first communication link 210 is reduced by receiving at least one packet transmitted from the second external electronic device 202 through the second communication link 220, the processor 320 may refrain from receiving the at least one packet transmitted from the second external electronic device 202 through the second communication link 220.

Although operation 812 of FIG. 8 illustrates an operation of bypassing receiving the at least one packet from the second external electronic device 202 through the second communication link 220 when at least a portion of the second time resources overlaps at least a portion of the third time resources, this operation may be replaced by another operation. For example, when at least one packet is not received from the first external electronic device 101 in a portion of the third time resources even when at least a portion of the second time resources overlap at least a portion of the third time resources, the processor 320 may receive the at least one packet from the second external electronic device 202 through the second communication link 220 based on at least a portion of the third time resources.

As described above, the electronic device 201 may prevent the quality of the first communication link 210 from being reduced by the second communication link 220 by determining whether to receive at least one packet received through the second communication link 220 after establishing the second communication link 220. Since determining whether to receive the at least one packet through the second communication link 220 after establishing the second communication link 220, the electronic device 201 may adaptively control at least one of reception through the first communication link 210 or reception through the second communication link 220 according to a state of the first communication link 210 and a state of the second communication link 220.

Figure 9:
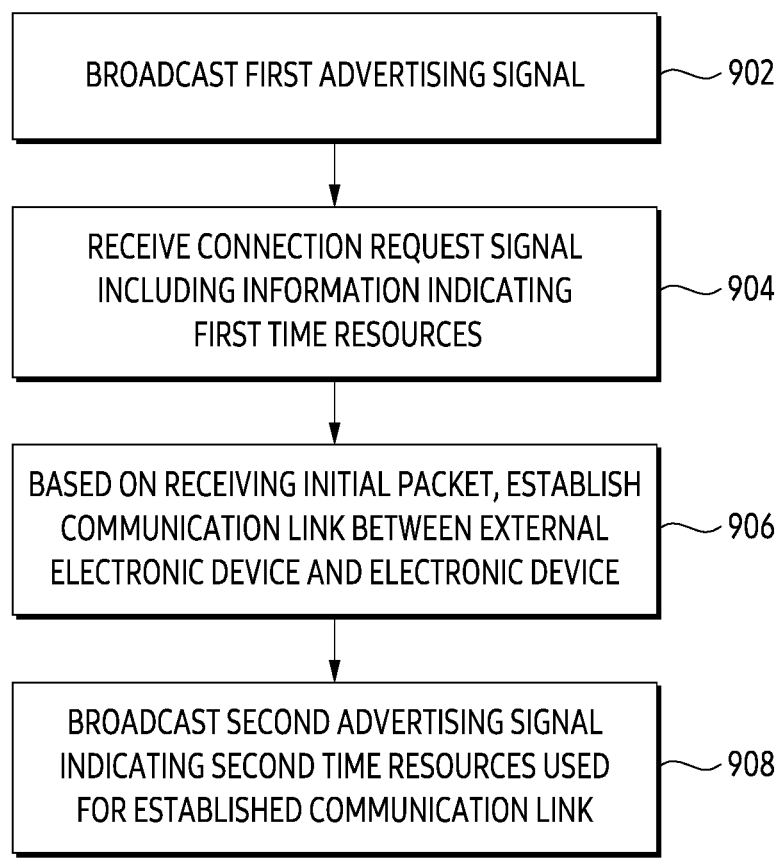
FIG. 9 is a flowchart illustrating a method of transmitting a second advertising signal different from a first advertising signal, according to an embodiment.

FIG. 9 is a flowchart illustrating a method of transmitting a second advertising signal different from a first advertising signal, according to an embodiment. This method may be executed by the electronic device 201 illustrated in FIG. 2, the electronic device 201 illustrated in FIG. 3, or the processor 320 of the electronic device 201.

Referring to FIG. 9, in operation 902, the processor 320 may broadcast a first advertising signal. For example, the processor 320 may periodically broadcast the first advertising signal so that the external electronic device may scan the electronic device 201.

In operation 904, the processor 320 may receive, from the external electronic device, a connection request signal including information indicating first time resources to be used to receive the initial packet transmitted from the external electronic device (e.g., the first external electronic device 101) based on the first advertising signal and to be transmitted from the external electronic device. For example, the connection request signal may include data on the size of the window for receiving the initial packet and data on the initiating timing of the window in the information. In operation 906, the processor 320 may establish a communication link (e.g., a first communication link 210) between the external electronic device and the electronic device 201 based on receiving the initial packet transmitted based on the first time resources from the external electronic device. For example, the communication link may be used for a packet transmitted from the external electronic device to the electronic device 201. For example, the communication link may be a communication link for an ACL or a communication link for a CIS. For example, when the communication link is a communication link for the CIS, a CIS event may be scheduled within a connection interval of the communication link. The CIS event may be used to provide the packet to the electronic device 201. In an embodiment, the CIS event may include a plurality of sub-events. In an embodiment, a connected isochronous group (CIG) event including the CIS event and other CIS events may be scheduled within the connection interval of the communication link. However, it is not limited thereto.

In operation 908, the processor 320 may broadcast a second advertising signal indicating second time resources used for the communication link based on establishing the communication link. For example, the second advertising signal may be the second advertising signal defined through the description of FIG. 3. For example, the second advertising signal may be a signal periodically broadcasted from the electronic device 201 while the communication link is maintained. For example, the processor 320 may broadcast the second advertising signal among the first advertising signal and the second advertising signal while the communication link is maintained, and broadcast the first advertising signal among the first advertising signal and the second advertising signal based on identifying that the communication link is released. However, it is not limited thereto.

As described above, the electronic device 201 may broadcast the second advertising signal distinguished from the first advertising signal on a condition that a communication link between the electronic device 201 and the external electronic device is established. Since the second advertising signal includes information on the established communication link, different from the first advertising signal, another external electronic device receiving the second advertising signal may allocate time resources that do not overlap with time resources used for the first communication link 210 to the electronic device 201. In other words, the electronic device 201 may enhance the quality of communication with each of a plurality of external electronic devices by broadcasting the second advertising signal.

Figure 10:
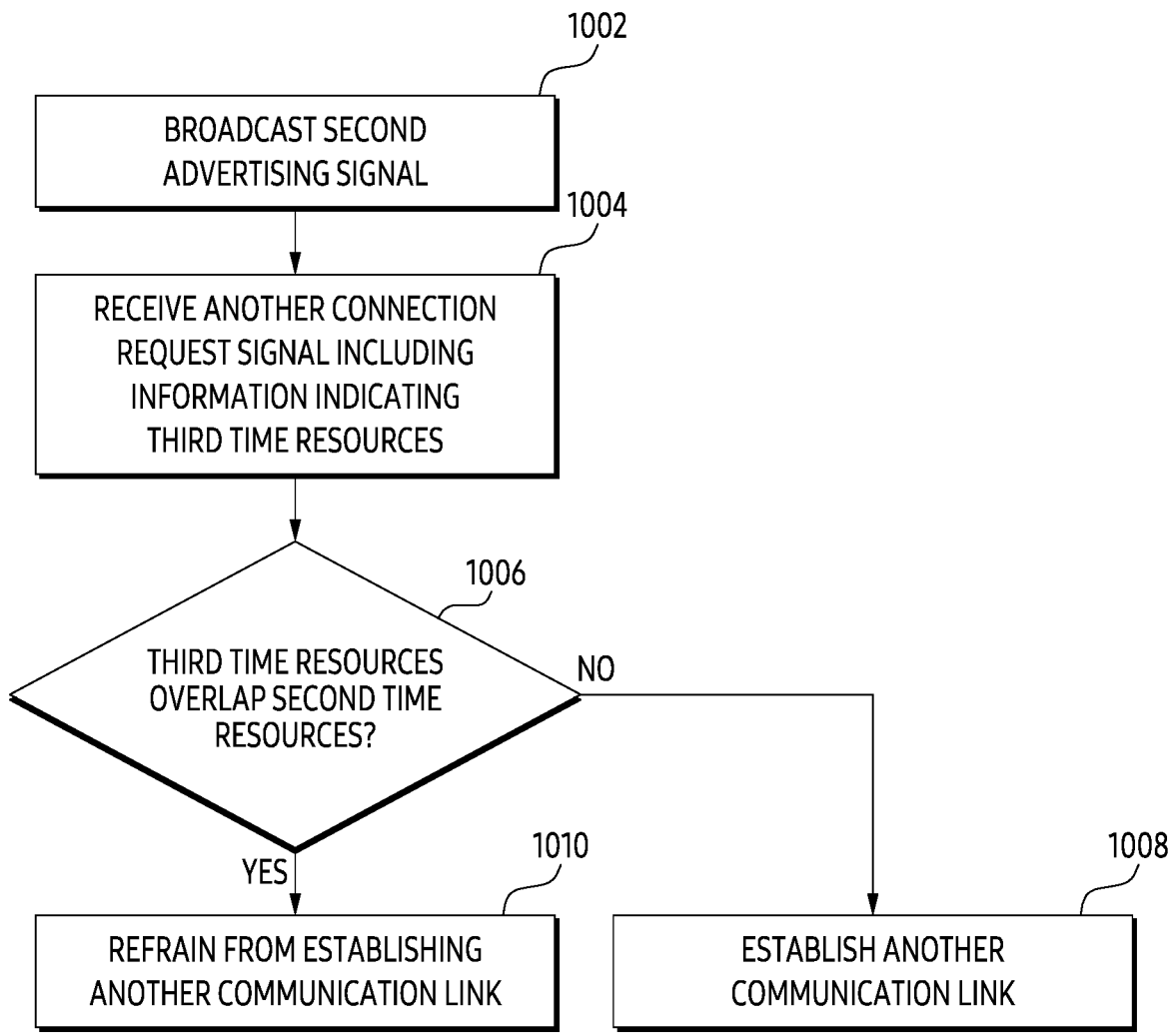
FIG. 10 is a flowchart illustrating a method of identifying whether to establish a communication link with another external electronic device based on a connection request signal received from another external electronic device after broadcasting a second advertising signal according to an embodiment.

FIG. 10 is a flowchart illustrating a method of identifying whether to establish a communication link with another external electronic device based on a connection request signal received from another external electronic device after broadcasting a second advertising signal according to an embodiment. This method may be executed by the electronic device 201 illustrated in FIG. 2, the electronic device 201 illustrated in FIG. 3, or the processor 320 of the electronic device 201.

Referring to FIG. 10, in operation 1002, the processor 320 may broadcast the second advertising signal. For example, operation 1002 may correspond to operation 908 of FIG. 9. In operation 1004, the processor 320 may receive, from the second external electronic device, another connection request signal including information indicating third time resources to be used to receive the initial packet to be transmitted from another external electronic device (e.g., a second external electronic device 202), hereinafter, a second external electronic device) distinguished from the external electronic device (e.g., the first external electronic device 101, hereinafter, the first external electronic device) defined through the descriptions of FIG. 9 based on the second advertising signal and to be transmitted from the second external electronic device. For example, the other connection request signal may include data on the size of the window for receiving the initial packet and data on the initial timing of the window in the information.

In operation 1006, the processor 320 may identify whether the third time resources overlap the second time resources (e.g., the second time resources defined through operation 908 of FIG. 9) used for a communication link (e.g., the first communication link 210) between the first external electronic device and the electronic device 201. For example, the processor 320 may execute operation 1010 on a condition that at least a portion of the third time resources overlap at least a portion of the second time resources, otherwise execute operation 1008.

In operation 1008, the processor 320 may establish another communication link (e.g., a second communication link 220) between the second external electronic device and the electronic device 201 by receiving the initial packet transmitted based on the third time resources from the second external electronic device, based on identifying that the third time resources do not overlap the second time resources. For example, the other communication link may be used to obtain data having an attribute distinguished from the attribute of data transmitted to the electronic device 201 through the communication link from the second external electronic device. For example, the time resources used for the other communication link may be distinguished from the second time resources used for the communication link.

In operation 1010, processor 320 may refrain from establishing the other communication link by bypassing receiving the initial packet transmitted from the second external electronic device based on the third time resources, based on identifying that at least a portion of the third time resources overlap at least a portion of the second time resources. For example, the processor 320 may estimate, through operation 1006, that at least a portion of time resources to be used for the other communication link overlap at least a portion of the second time resources used for the communication link, and refrain from establishing the other communication link based on the estimation.

As described above, while the communication link (e.g., the first communication link 210) between the electronic device 201 and the first external electronic device is maintained, the electronic device 201 may compare time resources used for the other communication link (e.g., the second communication link 220) between the electronic device 201 and the second external electronic device with time resources used for the communication link. The electronic device 201 may prevent the quality of the maintained communication link from decreasing through the comparison. In other words, the electronic device 201 may maintain the quality of the communication link by blocking the second external electronic device capable of reducing the quality of the maintained communication link from connecting to the electronic device 201 in despite of the second advertising signal.

Figure 11:
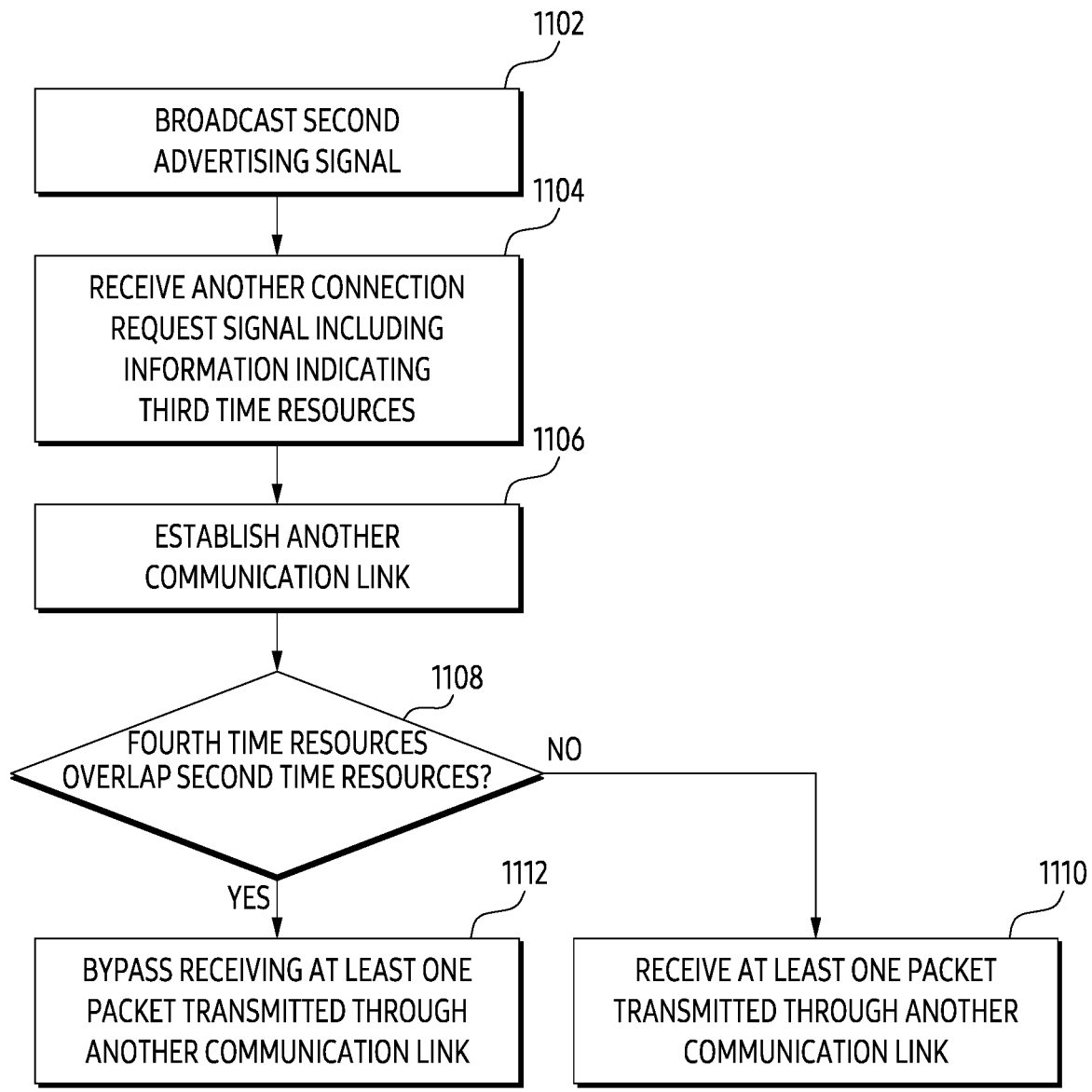
FIG. 11 is a flowchart illustrating a method of identifying whether to receive at least one packet through an established communication link after establishing the communication link between a second external electronic device and an electronic device based on a second advertising signal.

FIG. 11 is a flowchart illustrating a method of identifying whether to receive at least one packet through an established communication link after establishing the communication link between a second external electronic device and an electronic device based on a second advertising signal. This method may be executed by the electronic device 201 illustrated in FIG. 2, the electronic device 201 illustrated in FIG. 3, or the processor 320 of the electronic device 201. Referring to FIG. 11, in operation 1102, the processor 320 may broadcast the second advertising signal. For example, operation 1102 may correspond to operation 908 of FIG. 9. However, it is not limited thereto.

In operation 1104, the processor 320 may receive another connection request signal including information indicating third time resources to be used to receive the initial packet transmitted from the second external electronic device based on the first advertising signal or the second advertising signal and to be transmitted from the second external electronic device. For example, operation 1104 may correspond to operation 1004 of FIG. 10.

In operation 1106, the processor 320 may establish another communication link (e.g., a second communication link 220) between the second external electronic device and the electronic device 201 based on receiving the initial packet transmitted from the second external electronic device based on the third time resources.

In operation 1108, after establishing the other communication link, the processor 320 may identify whether fourth time resources used for the other communication link overlap the second time resources used for the communication link (e.g., the first communication link 210) between the first external electronic device and the electronic device 201. For example, the processor 320 may execute operation 1112 on a condition that at least a portion of the fourth time resources overlap with at least a portion of the second time resources, otherwise execute operation 1110.

In operation 1110, the processor 320 may receive the at least one packet transmitted through the other communication link from the second external electronic device based on identifying that the fourth time resources do not overlap the second time resources. For example, when the fourth time resources are distinguished from the second time resources, since reception performance of at least one packet transmitted from the first external electronic device for the communication link is not reduced by reception of the at least one packet transmitted from the second external electronic device through the other communication link, the processor 320 may receive the at least one packet transmitted through the other communication link from the second external electronic device.

In operation 1112, the processor 320 may bypass receiving the at least one packet transmitted from the second external electronic device through the other communication link based on identifying that at least a portion of the fourth time resources overlap at least a portion of the second time resources. For example, when at least a portion of the fourth time resources overlap at least a portion of the second time resources, since reception performance of at least one packet transmitted from the first external electronic device for the communication link may be reduced by reception of the at least one packet transmitted from the second external electronic device through the other communication link, the processor 320 may bypass receiving the at least one packet transmitted through the other communication link from the second external electronic device. In an embodiment, when the priority of the at least one packet transmitted through the other communication link is higher than the priority of the at least one packet transmitted through the communication link, the processor 320 may bypass receiving the at least one packet transmitted through the communication link from the first external electronic device.

As described above, the electronic device 201 may maintain the quality of the communication link by blocking the reception of at least one packet transmitted through the other communication link from the second external electronic device, after establishing another communication link (e.g., second communication link 220) having a connection interval overlapping the connection interval of the communication link (e.g., first communication link 210) in despite of the second advertising signal.

Figure 12:
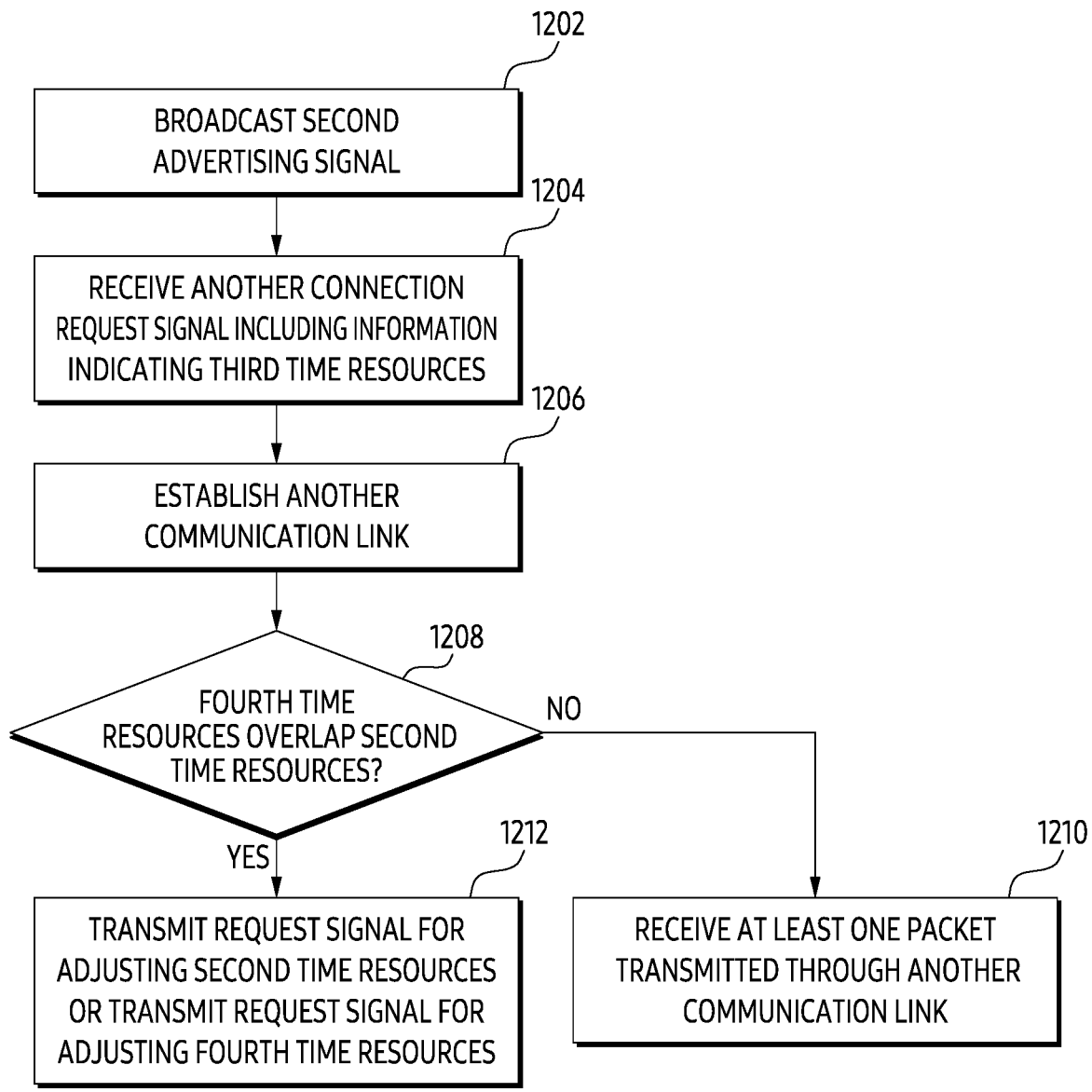
FIG. 12 is a flowchart illustrating a method of transmitting a request signal for adjusting time resources to a first external electronic device or a second external electronic device after establishing a communication link between a second external electronic device and an electronic device based on a second advertising signal.

FIG. 12 is a flowchart illustrating a method of transmitting a request signal for adjusting time resources to a first external electronic device or a second external electronic device after establishing a communication link between a second external electronic device and an electronic device based on a second advertising signal. This method may be executed by the electronic device 201 illustrated in FIG. 2, the electronic device 201 illustrated in FIG. 3, or the processor 320 of the electronic device 201.

Referring to FIG. 12, in operation 1202, the processor 320 may broadcast the second advertising signal. For example, operation 1202 may correspond to operation 908 of FIG. 9. In operation 1204, the processor 320 may receive another connection request signal including information indicating third time resources to be used to receive the initial packet transmitted from the second external electronic device based on the first advertising signal or the second advertising signal and to be transmitted from the second external electronic device. For example, operation 1204 may correspond to operation 1104 of FIG. 11.

In operation 1206, the processor 320 may establish another communication link (e.g., a second communication link 220) between the second external electronic device and the electronic device 201 based on receiving the initial packet transmitted from the second external electronic device based on the third time resources.

In operation 1208, after establishing the other communication link, the processor 320 may identify whether the fourth time resources used for the other communication link overlap the second time resources used for the communication link between the first external electronic device and the electronic device 201. For example, the processor 320 may execute operation 1212 on a condition that at least a portion of the fourth time resources overlap at least a portion of the second time resources, otherwise operation 1210.

In operation 1210, the processor 320 may receive at least one packet transmitted from the second external electronic device through the other communication link based on identifying that the fourth time resources do not overlap the second time resources. For example, when the fourth time resources are distinguished from the second time resources, since reception performance of at least one packet transmitted from the first external electronic device for the communication link is not reduced by reception of the at least one packet transmitted from the second external electronic device through the other communication link, the processor 320 may receive the at least one packet transmitted through the other communication link from the second external electronic device.

In operation 1212, the processor 320 may transmit a request signal for adjusting the second time resources to the first external electronic device or transmit a request signal for adjusting the fourth time resources to the second external electronic device based on identifying that at least a portion of the fourth time resources overlap at least a portion of the second time resources. For example, in response to identifying that at least a portion of the fourth time resources overlap at least a portion of the second time resources, the processor 320 may identify at least one of an attribute of a packet received through the communication link, an attribute of a packet received through the other communication link, a priority of a service provided based on a packet received through the communication link, a priority of a service provided based on a packet received through the other communication link, a type of a service provided based on a packet received through the communication link and a type of a service provided based on a packet received through the other communication link, an amount of load required to process a packet received through the communication link and an amount of load required to process a packet received through the other communication link, a distance between the electronic device and the first external electronic device, a distance between the electronic device and the second external electronic device, a quality of the communication link or a quality of the other communication link, and transmit, based on the identification, the request signal for adjusting the second time resources to the first external electronic device, or transmit the request signal for adjusting the fourth time resources to the second external electronic device.

As described above, the electronic device 201 may transmit a request signal for adjusting time resources used for the communication link or adjusting time resources used for the other communication link based on identifying that at least a portion of time resources used for the communication link overlap at least a portion of time resources used for the other communication link despite the second advertising signal. The electronic device 201 may enhance the quality of the communication link and the quality of other communication links by transmitting the request signal so that the time resources used for the communication link do not overlap the time resources used for the other communication link.

Figure 13:
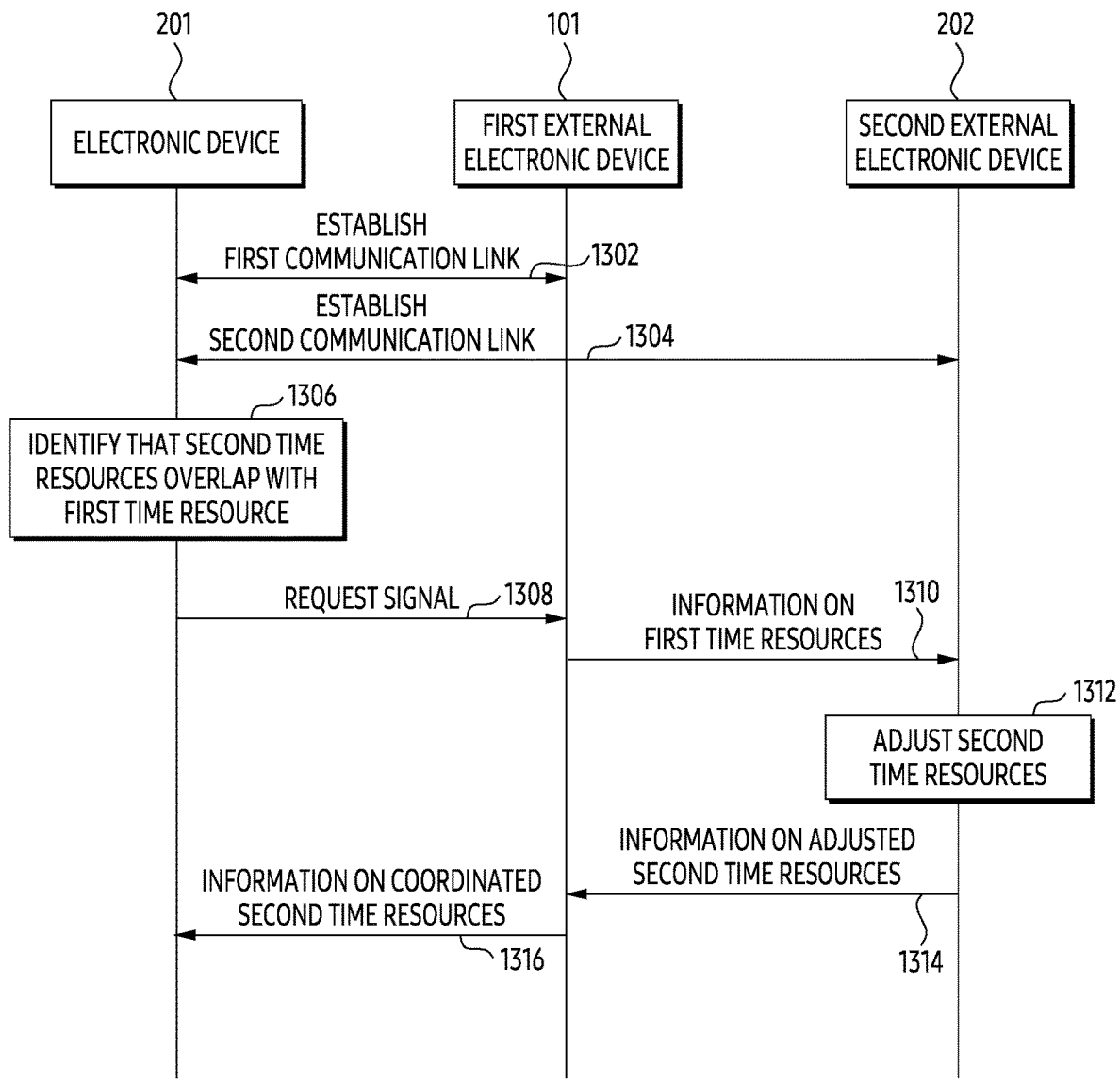
FIG. 13 illustrates a signal flow caused by an electronic device, a first external electronic device, and a second external electronic device to adjust time resources for communication with the electronic device, according to an embodiment.

FIG. 13 illustrates a signal flow caused by an electronic device, a first external electronic device, and a second external electronic device to adjust time resources for communication with the electronic device, according to an embodiment. This signal flow may be caused by the first external electronic device 101, the electronic device 201, and the second external electronic device 202 illustrated in FIG. 2.

Referring to FIG. 13, in operation 1302, the electronic device 201 may establish a first communication link (e.g., a first communication link 210) between the electronic device 201 and the first external electronic device 101. In operation 1304, the electronic device 201 may establish a second communication link (e.g., a second communication link 220) between the electronic device 201 and the second external electronic device 202.

In operation 1306, the electronic device 201 may identify that second time resources used for the second communication link 220 overlap first time resources used for the first communication link 210 based on establishing the second communication link 220.

In operation 1308, the electronic device 201 may transmit a request signal requesting the first external electronic device 101 to adjust the second time resources based on the identification. The first external electronic device 101 may receive the request signal from the electronic device 201.

In operation 1310, the first external electronic device 101 may transmit information on the first time resources used for the first communication link 210 between the electronic device 201 and the first external electronic device 101 to the second external electronic device 202 based on receiving the request signal. For example, in response to receiving the request signal, the first external electronic device 101 may identify the first time resources allocated for at least one packet transmitted to the electronic device 201 and transmit information on the first time resources to the second external electronic device 202. The second external electronic device 202 may receive information on the first time resources from the first external electronic device 101. Although not illustrated in FIG. 13, when a communication link (e.g., a third communication link 230) between the first external electronic device 101 and the second external electronic device 202 is not established, the first external electronic device 101 may establish the communication link between the first external electronic device 101 and the second external electronic device 202, based on receiving the request signal, and transmit information on the first time resources to the second external electronic device 202 through the established communication link. In operation 1312, the second external electronic device 202 may adjust the second time resources so that the second time resources do not overlap the first time resources based on receiving information on the first time resources.

In operation 1314, the second external electronic device 202 may transmit information on the adjusted second time resources to the first external electronic device 101. For example, the second external electronic device 202 may transmit information on the adjusted second time resources to the first external electronic device 101 to transmit information on the adjusted second time resources to the electronic device 201. The first external electronic device 101 may receive information on the adjusted second time resources from the second external electronic device 202. In operation 1316, the first external electronic device 101 may transmit information on the adjusted second time resources to the electronic device 201. The electronic device 201 may receive information on the adjusted second time resources from the first external electronic device 101. In an embodiment, information on the adjusted second time resources may be transmitted within the first time resources. However, it is not limited thereto. Meanwhile, after receiving information on the adjusted second time resources, the electronic device 201 may receive at least one packet from the second external electronic device 202 through the second communication link 220 in the adjusted second time resources.

In an embodiment, operation 1308 of FIG. 13 may be replaced by an operation in which the electronic device 201 transmits the request signal to the second external electronic device 202. In this case, the request signal may include information on the first time resources. The second external electronic device 202 receiving the request signal may adjust the second time resources based on the first time resources and transmit information on the adjusted second time resources to the electronic device 201 through the first external electronic device 101 or to the electronic device 201 directly.

In an embodiment, operations 1314 and 1316 of FIG. 13 may be replaced by an operation in which the second external electronic device 202 directly transmits information on the adjusted second time resources to the electronic device 201. In this case, the information on the adjusted second time resources may be transmitted from the second external electronic device 202 to the electronic device 201 based on time resources that do not overlap the first time resources. Meanwhile, although not illustrated in FIG. 13, while the first communication link 210 and the second communication link 220 established according to operation 1302 and operation 1304 are maintained, the first external electronic device 101 may identify that the second time resources overlap the first time resources based on the exchange of information with the second external electronic device 202, instead of receiving the above request signal in operation 1308. Based on the identifying, the first time resources or the second time resources may be adjusted so that the first time resources and the second time resources do not overlap each other.

According to an embodiment, the electronic device, the method, and the computer-readable storage medium can enhance the quality of communication with the first external electronic device and the quality of communication with the second external electronic device, by executing at least one operation to adjust the first time resources allocated from the first external electronic device and the second time resources allocated from the second external electronic device to not overlap.

As described above, according to an embodiment, an electronic device (e.g. electronic device 201) may comprise a communication circuitry (e.g., a communication circuit 390) for Bluetooth low energy (BLE), at least one memory (e.g., memory 330) configured to store instructions, and at least one processor (e.g. processor 320) operably coupled with the communication circuitry; wherein the at least one processor may be, when the instructions are executed, configured to, while a first communication link with a first external electronic device (e.g., a first communication link 210) operating as a first master device with respect to the electronic device (e.g., a first communication link 101) is maintained, identify a second communication link (e.g., a second communication link 220) with a second external electronic device (e.g., a second external electronic device 202) operating as a second master device with respect to the electronic device; identify whether at least a portion of first time resources used for the first communication link overlap with at least portion of second time resources used or to be used for the second communication link or not; and based on identifying that at least the portion of the first time resources overlap with at least the portion of the second time resources, transmit a first request signal for adjusting the first time resources to the first external electronic device or transmit a second request signal for adjusting the second time resources to the second external electronic device.

In an embodiment, the at least one processor may be, when the instructions are executed, configured to identify, based on type of a first service provided based on at least one packet received through the first communication link from the first external electronic device and type of a second service provided based on at least one packet received through the second communication link 220 from the second external electronic device, a priority of the first service and a priority of the second service; and transmit, based on a result of comparison between the priority of the first service and the priority of the second service, the first request signal to the first external electronic device or the second request signal to the second external electronic device.

In an embodiment, the at least one processor may be, when the instructions are executed, configured to compare, with amount of first resources of the electronic device consumed to process at least one packet received through the first communication link from the first external electronic device, amount of second resources of the electronic device consumed to process at least one packet through the second communication link from the second external electronic device; and transmit, based on a result of the comparison between the amount of the first resources and the amount of the second resources, the first request signal to the first external electronic device or the second request signal to the second external electronic device.

In an embodiment, each of the first communication link and the second communication link may comprise a communication link for asynchronous connection-less (ACL) or a communication link for connected isochronous stream (CIS). For example, each of the first time resources and the second time resources may be, when each of the first communication link and the second communication link is a communication link for the CIS, identified based on at least one of a CIS ISO time interval, a length of a CIS sub event, an anchor point of a CIS event, or number of CIS sub events.

In an embodiment, the at least one processor may be, when the instructions are executed, further configured to broadcast, while the first communication link is maintained before the second communication link is established, an advertising signal including information indicating the first time resources.

In an embodiment, the at least one processor may be, when the instructions are executed, further configured to, before the second communication link is established, receive, from the second external electronic device, a connection request signal that is transmitted based on an advertising signal from the second external electronic device, the connection request signal including information indicating third time resources to be used for receiving an initial packet to be transmitted from the second external electronic device; compare the third time resources with the first time resources; and according to a result of the comparison between the first time resources and the third time resource, establish the second communication link with the second external electronic device by receiving the initial packet from the second external electronic device based on the third time resources or refrain from establishing the second communication link by bypassing to receive the initial packet from the second external electronic device based on the third time resources.

In an embodiment, the at least one processor may be, when the instructions are executed, further configured to refrain, based on identifying that at least the portion of the first time resources overlap with at least the portion of the second time resources, from receiving at least one packet through the first communication link from the first external electronic device by using at least the portion of the first time resources overlapping with at least the portion of the second time resources or refrain from receiving at least one packet through the second communication link from the second external electronic device by using at least the portion of the second time resources overlapping with at least the portion of the first time resources, instead of transmitting the first request signal and the second request signal.

In an embodiment, the second time resources may be identified based on transmitWindowOffset and transmitWindowSize in information included in a connection request signal, the connection request signal received from the second external electronic device before the second communication link is established.

In an embodiment, the first request signal may include information for indicating the second time resources, and wherein the second request signal may include information for indicating the first time resources.

As described above, according to an embodiment, an electronic device (e.g. electronic device 201) may comprise a communication circuitry (e.g., a communication circuit 390) for Bluetooth low energy (BLE), at least one memory (e.g., memory 330) configured to store instructions, and at least one processor (e.g. processor 320) operably coupled with the communication circuitry; wherein the at least one processor may be, when the instructions are executed, configured to establish a first communication link (e.g., a first communication link 210) between a first external electronic device (e.g., a first external electronic device 101) and the electronic device; receive a connection request signal including information indicating the first time resources to be used to receive the initial packet transmitted from a second external electronic device (e.g., a second external electronic device 202) based on an advertising signal broadcast from the electronic device while the first communication link is maintained and to be transmitted from the second external electronic device; compare the first time resources with second time resources for at least one packet received from the first external electronic device through the first communication link; establish a second communication link (e.g., a second communication link 220) between the second external electronic device and the electronic device by receiving the initial packet transmitted from the second external electronic device based on the first time resources according to the result of the comparison; and refrain from establishing the second communication link by bypassing receiving the initial packet transmitted from the second external electronic device based on the first time resources.

In an embodiment, an electronic device (e.g. electronic device 201) may comprise a communication circuitry (e.g., a communication circuit 390) for Bluetooth low energy (BLE), at least one memory (e.g., memory 330) configured to store instructions, and at least one processor (e.g. processor 320) operably coupled with the communication circuitry; wherein the at least one processor may be, when the instructions are executed, configured to establish a first communication link (e.g., a first communication link 210) between a first external electronic device and the electronic device; receive a connection request signal including information indicating the first time resources to be used to receive the initial packet transmitted from a second external electronic device based on an advertising signal broadcast from the electronic device while the first communication link is maintained and to be transmitted from the second external electronic device; establish a second communication link (e.g., a second communication link 220) between the second external electronic device and the electronic device based on receiving the initial packet transmitted based on the first time resources from the second external electronic device; identify second time resources used for the second communication link; compare the second time resources with the third time resources used for the first communication link; and bypass receiving at least one packet after the initial packet transmitted from the second external electronic device through the second communication link or receiving the at least one packet transmitted from the second external electronic device through the other communication link according to the result of the comparison.

As described above, according to an embodiment, an electronic device (e.g. electronic device 201) may comprise a communication circuitry (e.g., a communication circuit 390) for Bluetooth low energy (BLE), at least one memory (e.g., memory 330) configured to store instructions, and at least one processor (e.g. processor 320) operably coupled with the communication circuitry; wherein the at least one processor may be, when the instructions are executed, configured to establish a first communication link (e.g., a first communication link 210) between a first external electronic device and the electronic device; receive a connection request signal including information indicating the first time resources to be used to receive the initial packet transmitted from a second external electronic device based on an advertising signal broadcast from the electronic device while the first communication link is maintained and to be transmitted from the second external electronic device; establish a second communication link (e.g., a second communication link 220) between the second external electronic device and the electronic device based on receiving the initial packet transmitted based on the first time resources from the second external electronic device; identify second time resources used for the second communication link; compare the second time resources with the third time resources used for the first communication link; and transmit a request signal for adjusting the second time resources to the second external electronic device or transmit a request signal for adjusting the third time resources to the first external electronic device based on the result of the comparison.

As described above, according to an embodiment, a method for operating an electronic device with a communication circuit for Bluetooth low energy (BLE) may include broadcasting the first advertising signal; receiving a connection request signal including information indicating the first time resources to be used to receive the initial packet transmitted from an external electronic device (e.g., a first external electronic device 101) based on the first advertising signal and to be transmitted from the external electronic device; establishing a communication link between the external electronic device and the electronic device based on receiving the initial packet transmitted from the external electronic device based on the first time resources; and broadcasting a second advertising signal further including information indicating the second time resources used for the communication link with respect to the first advertising signal based on establishing the communication link.

As described above, according to an embodiment, a method for operating an electronic device with a communication circuit for Bluetooth low energy (BLE) may include establishing a first communication link (e.g., the first communication link 210) between the first external electronic device (e.g., the first external electronic device 101) and the electronic device; while the first communication link is maintained, receiving a connection request signal including information indicating the first time resources to be used to receive the initial packet transmitted from a second external electronic device (e.g., a second external electronic device 202) based on an advertising signal broadcast from the electronic device and to be transmitted from the second external electronic device; comparing the first time resources with second time resources for at least one packet received from the first external electronic device through the first communication link; and refraining from establishing the second communication link by bypassing establishing a second communication link (e.g., a second communication link 220) between the second external electronic device and the electronic device by receiving the initial packet transmitted from the second external electronic device based on the first time resources and receiving the initial packet transmitted from the second external electronic device based on the first time resources.

As described above, according to an embodiment, a method for operating an electronic device with a communication circuit for Bluetooth low energy (BLE) may include establishing a first communication link (e.g., a first communication link 210) between a first external electronic device and the electronic device; receiving a connection request signal including information indicating the first time resources to be used to receive the initial packet transmitted from a second external electronic device based on an advertising signal broadcast from the electronic device while the first communication link is maintained and to be transmitted from the second external electronic device; establishing a second communication link (e.g., a second communication link 220) between the second external electronic device and the electronic device based on receiving the initial packet transmitted based on the first time resources from the second external electronic device; identifying second time resources used for the second communication link; comparing the second time resources with the third time resources used for the first communication link; and bypassing receiving at least one packet after the initial packet transmitted from the second external electronic device through the second communication link or receiving the at least one packet transmitted from the second external electronic device through the other communication link according to the result of the comparison.

As described above, according to an embodiment, a method for operating an electronic device with a communication circuit for Bluetooth low energy (BLE) may include establishing a first communication link (e.g., a first communication link 210) between a first external electronic device and the electronic device; receiving a connection request signal including information indicating the first time resources to be used to receive the initial packet transmitted from a second external electronic device based on an advertising signal broadcast from the electronic device while the first communication link is maintained and to be transmitted from the second external electronic device; establishing a second communication link (e.g., a second communication link 220) between the second external electronic device and the electronic device based on receiving the initial packet transmitted based on the first time resources from the second external electronic device; identifying second time resources used for the second communication link; comparing the second time resources with the third time resources used for the first communication link; and transmitting a request signal for adjusting the second time resources to the second external electronic device or transmitting a request signal for adjusting the third time resources to the first external electronic device based on the result of the comparison. As described above, according to an embodiment, a non-transitory computer readable storage medium may store one or more programs, the one or more programs comprising instructions which, when executed by at least one processor of an electronic device with a communication circuitry for Bluetooth low energy (BLE), cause the electronic device to broadcast the first advertising signal; receive a connection request signal including information indicating the first time resources to be used to receive the initial packet transmitted from an external electronic device (e.g., a first external electronic device 101) based on the first advertising signal and to be transmitted from the external electronic device; establish a communication link between the external electronic device and the electronic device based on receiving the initial packet transmitted from the external electronic device based on the first time resources; and broadcast a second advertising signal further including information indicating the second time resources used for the communication link with respect to the first advertising signal based on establishing the communication link.

As described above, according to an embodiment, a non-transitory computer readable storage medium may store one or more programs, the one or more programs comprising instructions which, when executed by at least one processor of an electronic device with a communication circuitry for Bluetooth low energy (BLE), cause the electronic device to establish a first communication link (e.g., the first communication link 210) between the first external electronic device (e.g., the first external electronic device 101) and the electronic device; while the first communication link is maintained, receive a connection request signal including information indicating the first time resources to be used to receive the initial packet transmitted from a second external electronic device (e.g., a second external electronic device 202) based on an advertising signal broadcast from the electronic device and to be transmitted from the second external electronic device; compare the first time resources with second time resources for at least one packet received from the first external electronic device through the first communication link; and refrain from establishing the second communication link by bypassing establishing a second communication link (e.g., a second communication link 220) between the second external electronic device and the electronic device by receiving the initial packet transmitted from the second external electronic device based on the first time resources and receiving the initial packet transmitted from the second external electronic device based on the first time resources.

As described above, according to an embodiment, a non-transitory computer readable storage medium may store one or more programs, the one or more programs comprising instructions which, when executed by at least one processor of an electronic device with a communication circuitry for Bluetooth low energy (BLE), cause the electronic device to establish a first communication link (e.g., a first communication link 210) between a first external electronic device and the electronic device; receive a connection request signal including information indicating the first time resources to be used to receive the initial packet transmitted from a second external electronic device based on an advertising signal broadcast from the electronic device while the first communication link is maintained and to be transmitted from the second external electronic device; establish a second communication link (e.g., a second communication link 220) between the second external electronic device and the electronic device based on receiving the initial packet transmitted based on the first time resources from the second external electronic device; identify second time resources used for the second communication link; compare the second time resources with the third time resources used for the first communication link; and bypass receiving at least one packet after the initial packet transmitted from the second external electronic device through the second communication link or receiving the at least one packet transmitted from the second external electronic device through the other communication link according to the result of the comparison.

As described above, according to an embodiment, a non-transitory computer readable storage medium may store one or more programs, the one or more programs comprising instructions which, when executed by at least one processor of an electronic device with a communication circuitry for Bluetooth low energy (BLE), cause the electronic device to establish a first communication link (e.g., a first communication link 210) between a first external electronic device and the electronic device; receive a connection request signal including information indicating the first time resources to be used to receive the initial packet transmitted from a second external electronic device based on an advertising signal broadcast from the electronic device while the first communication link is maintained and to be transmitted from the second external electronic device; establish a second communication link (e.g., a second communication link 220) between the second external electronic device and the electronic device based on receiving the initial packet transmitted based on the first time resources from the second external electronic device; identify second time resources used for the second communication link; compare the second time resources with the third time resources used for the first communication link; and transmit a request signal for adjusting the second time resources to the second external electronic device or transmit a request signal for adjusting the third time resources to the first external electronic device based on the result of the comparison.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program #40) including one or more instructions that are stored in a storage medium (e.g., internal memory #36 or external memory #38) that is readable by a machine (e.g., the electronic device #01). For example, a processor(e.g., the processor #20) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturers server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a communication circuitry for Bluetooth low energy (BLE);
at least one memory configured to store instructions; and
at least one processor operably coupled with the communication circuitry,
wherein the at least one processor is, when the instructions are executed, configured to:
while a first communication link with a first external electronic device operating as a first master device with respect to the electronic device is maintained, identify a second communication link with a second external electronic device operating as a second master device with respect to the electronic device;
identify whether at least a portion of first time resources used for the first communication link overlap with at least portion of second time resources used or to be used for the second communication link or not; and
based on identifying that at least the portion of the first time resources overlap with at least the portion of the second time resources, transmit a first request signal for adjusting the first time resources to the first external electronic device or transmit a second request signal for adjusting the second time resources to the second external electronic device.

2. The electronic device of claim 1, wherein the at least one processor is, when the instructions are executed, configured to:
identify, based on type of a first service provided based on at least one packet received through the first communication link from the first external electronic device and type of a second service provided based on at least one packet received through the second communication link from the second external electronic device, a priority of the first service and a priority of the second service; and
transmit, based on a result of comparison between the priority of the first service and the priority of the second service, the first request signal to the first external electronic device or the second request signal to the second external electronic device.

3. The electronic device of claim 1, wherein the at least one processor is, when the instructions are executed, configured to:
compare, with amount of first resources of the electronic device consumed to process at least one packet received through the first communication link from the first external electronic device, amount of second resources of the electronic device consumed to process at least one packet through the second communication link from the second external electronic device; and
transmit, based on a result of the comparison between the amount of the first resources and the amount of the second resources, the first request signal to the first external electronic device or the second request signal to the second external electronic device.

4. The electronic device of claim 1, wherein each of the first communication link and the second communication link comprises a communication link for asynchronous connection-less (ACL) or a communication link for connected isochronous stream (CIS).

5. The electronic device of claim 4, wherein each of the first time resources and the second time resources is identified based on at least one of a CIS ISO time interval, a length of a CIS sub event, an anchor point of a CIS event, or a number of CIS sub events, if each of the first communication link and the second communication link is the communication link for the CIS.

6. The electronic device of claim 1, wherein the at least one processor is, when the instructions are executed, further configured to broadcast, while the first communication link is maintained before the second communication link is established, an advertising signal including information indicating the first time resources.

7. The electronic device of claim 1, wherein the at least one processor is, when the instructions are executed, further configured to:
before the second communication link is established, receive, from the second external electronic device, a connection request signal that is transmitted based on an advertising signal from the second external electronic device, the connection request signal including information indicating third time resources to be used for receiving an initial packet to be transmitted from the second external electronic device;
compare the third time resources with the first time resources; and
according to a result of the comparison between the first time resources and the third time resource, establish the second communication link with the second external electronic device by receiving the initial packet from the second external electronic device based on the third time resources or refrain from establishing the second communication link by bypassing to receive the initial packet from the second external electronic device based on the third time resources.

8. The electronic device of claim 1, wherein the at least one processor is, when the instructions are executed, further configured to:
based on identifying that at least the portion of the first time resources overlap with at least the portion of the second time resources, refrain from receiving at least one packet through the first communication link from the first external electronic device by using at least the portion of the first time resources overlapping with at least the portion of the second time resources or refrain from receiving at least one packet through the second communication link from the second external electronic device by using at least the portion of the second time resources overlapping with at least the portion of the first time resources, instead of transmitting the first request signal and the second request signal.

9. The electronic device of claim 1, wherein the second time resources are identified based on transmitWindowOffset and transmitWindowSize in information included in a connection request signal, the connection request signal received from the second external electronic device before the second communication link is established.

10. The electronic device of claim 1, wherein the first request signal includes information for indicating the second time resources, and
wherein the second request signal includes information for indicating the first time resources.

11. A method for operating an electronic device with a communication circuitry for Bluetooth low energy (BLE), the method comprising:
while a first communication link with a first external electronic device operating as a first master device with respect to the electronic device is maintained, establishing a second communication link with a second external electronic device operating as a second master device with respect to the electronic device;
identifying whether at least a portion of first time resources used for the first communication link overlap with at least portion of second time resources used or to be used for the second communication link or not; and
based on identifying that at least the portion of the first time resources overlap with at least the portion of the second time resources, transmitting a first request signal for adjusting the first time resources to the first external electronic device or transmitting a second request signal for adjusting the second time resources to the second external electronic device.

12. The method of claim 11, wherein transmitting the first request signal or the second request signal comprises:
identifying, based on type of a first service provided based on at least one packet received through the first communication link from the first external electronic device and type of a second service provided based on at least one packet received through the second communication link from the second external electronic device, a priority of the first service and a priority of the second service; and
transmitting, based on a result of comparison between the priority of the first service and the priority of the second service, the first request signal to the first external electronic device or the second request signal to the second external electronic device.

13. The method of claim 11, wherein transmitting the first request signal or the second request signal comprises:
comparing, with amount of first resources of the electronic device consumed to process at least one packet received through the first communication link from the first external electronic device, amount of second resources of the electronic device consumed to process at least one packet through the second communication link from the second external electronic device; and
transmitting, based on a result of the comparison between the amount of the first resources and the amount of the second resources, the first request signal to the first external electronic device or the second request signal to the second external electronic device.

14. The method of claim 11, wherein each of the first communication link and the second communication link comprises a communication link for asynchronous connection-less (ACL) or a communication link for connected isochronous stream (CIS).

15. The method of claim 14, wherein each of the first time resources and the second time resources is identified based on at least one of a CIS ISO time interval, a length of a CIS sub event, an anchor point of a CIS event, or a number of CIS sub events, if each of the first communication link and the second communication link is the communication link for the CIS.

16. The method of claim 11, further comprising:
broadcasting, while the first communication link is maintained before the second communication link is established, an advertising signal including information indicating the first time resources.

17. The method of claim 11, further comprising:
before the second communication link is established, receiving, from the second external electronic device, a connection request signal that is transmitted based on an advertising signal from the second external electronic device, the connection request signal including information indicating third time resources to be used for receiving an initial packet to be transmitted from the second external electronic device;

comparing the third time resources with the first time resources; and according to a result of the comparison between the first time resources and the third time resource, establishing the second communication link with the second external electronic device by receiving the initial packet from the second external electronic device based on the third time resources or refraining from establishing the second communication link by bypassing to receive the initial packet from the second external electronic device based on the third time resources.

18. The method of claim 11, further comprising:

based on identifying that at least the portion of the first time resources overlap with at least the portion of the second time resources, refraining from receiving at least one packet through the first communication link from the first external electronic device by using at least the portion of the first time resources overlapping with at least the portion of the second time resources or refraining from receiving at least one packet through the second communication link from the second external electronic device by using at least the portion of the second time resources overlapping with at least the portion of the first time resources, instead of transmitting the first request signal and the second request signal.

19. The method of claim 11, wherein the second time resources are identified based on transmitWindowOffset and transmitWindowSize in information included in a connection request signal, the connection request signal received from the second external electronic device before the second communication link is established.

20. The method of claim 11, wherein the first request signal includes information for indicating the second time resources, and wherein the second request signal includes information for indicating the first time resources.

* * * * *